United States Patent [19]

Adiletta

[11] Patent Number: 4,992,968

[45] Date of Patent: Feb. 12, 1991

[54] DIVISION METHOD AND APPARATUS INCLUDING USE OF A Z—Z PLOT TO SELECT ACCEPTABLE QUOTIENT BITS

[75] Inventor: Matthew J. Adiletta, Worcester, Mass.

[73] Assignee: Digital Equipment Corporation, Maynard, Mass.

[21] Appl. No.: 312,085

[22] Filed: Feb. 17, 1989

[51] Int. Cl.$^5$ .............................................. G06F 7/52
[52] U.S. Cl. ..................................................... 364/761
[58] Field of Search ............................... 364/761–764, 364/767

[56] References Cited

U.S. PATENT DOCUMENTS

| | | | |
|---|---|---|---|
| 4,481,600 | 11/1984 | Asai ..................................... | 364/765 |
| 4,603,397 | 7/1986 | Ohtsuki et al. ........................ | 364/763 |
| 4,635,220 | 1/1987 | Yahe et al. ........................... | 364/763 |
| 4,688,186 | 8/1987 | Ferrell et al. ........................ | 364/764 |
| 4,718,032 | 1/1988 | Irokulla et al. ...................... | 364/761 |
| 4,722,069 | 1/1988 | Ikea ..................................... | 364/767 |
| 4,949,295 | 8/1990 | Stealns ................................ | 364/761 |

OTHER PUBLICATIONS

"Design of the Arithmetic Units of ILLIA III: Use of Redundancy and Higher Radix Methods" by Atkins, IEEE Trans. on Comp., vol. C-19, No. 8, Aug. 1970, pp. 720–733.

"Higher-Radix Division Using Estimates of the Divisor and Partial Remainders" by Atkins, IEEE Trans. on Comp., vol. C-17, No. 10, Oct. 1968, pp. 925–934.

"A Division Algorithm with Prediction of Quotient Digits" by Ercegovac et al., IEEE No. CH2146-9/85, pp. 51-56.

"A Higher-Radix Division with Simple Selection of Quotient Digits" by Ercegovac, IEEE No. CH1892-9/83, pp. 94–98.

"Radix-16 Evaluation of Certain Elementary Functions" by Ercegovac, IEEE Trans. on Comp., Jun. 1973, pp. 290–295.

"Statistical Analysis of Certain Bineary Division Algorithms" by Freiman, Proceedings of the IRE, Jan. 1961, pp. 91–103.

"A Mathematical Procedure for Machine Divison" by Gilman, Comm. of ACM, pp. 10–12.

"On Optimal Iterative Schemes for High-Speed Division" by Krishnamurthy, IEEE Trans. on Comp., vol. C-19, No. 3, Mar. 1970 pp. 227–231.

"A Class of Binary Divisions Yielding Minimally Represented Quotients" by Metze, IRE Trans. on Electronic Computers, Dec. 1962, pp. 761–764.

"Radix 16 SRT Dividers with Overlapped Quotient Selection Stages" by Taylor, IEEE No. CH2146-9/85, pp. 64–71.

(List continued on next page.)

Primary Examiner—Dale M. Shaw
Attorney, Agent, or Firm—Finnegan, Henderson, Farabow, Garrett, and Dunner

[57] ABSTRACT

An optimized division circuit and a method of implementing the circuit includes the steps of determining a Z—Z plot relationship which represents a relationship between a first divisor ratio proportional to a range of previously determined remainder values divided by the divisor and a second divisor ratio equal to a range of succeeding remainder values divided by the divisor. A completer look-up table is automatically built from the Z—Z plot relationship which includes, for each different valid combination of divisor and next remainder values, either a corresponding quotient digit or a DON'T CARE indicator. A state value, used in the logical implementation of the circuit, is then assigned to each different quotient digit. The circuit includes a divisor multiple formation circuit, a quotient determining circuit and a quotient assimilation circuit. The divisor multiple formation circuit includes a divisor multiple multiplexer. The quotient determining circuit includes a next partial remainder determining circuit and a next quotient digit selection circuit. The quotient assimilation circuit subtracts negative values of quotient digits from positive values to determine a final quotient value.

22 Claims, 25 Drawing Sheets

OTHER PUBLICATIONS

"Compatible Hardware for Division and Square Root" by Taylor, IEEE No. CH1630-3/81, pp. 127-134.

"VAX Hardware for the Proposed IEEE Floating-Point Standard" by Taylor et al., IEEE No. CH1630-3/81, pp. 190-196.

"A Simple Postcorrection for Nonrestoring Division" by Rhyne, IEEE Trans. on Comp., Feb. 1971, pp. 213-216.

"An Algorithm for Division" by Svoboda, Inf. Process. Mach. 9:25-32 (1963).

"A Division Algorithm for Signed-Digit Arithmetic" by Tung, IEEE Trans. on Comp., Sep. 1968, pp. 887-889.

"An Algorithm for Rapid Binary Division" by Wilson, IRE Trans. on Electronic Computers, vol. EC-10, Dec. 1961, pp. 662-670.

Tan, K. G., "High Radix Division Quotient Selection by 2-Level Control Memories" IBM Technical Disclosure Bulletin, vol. 18, #3, pp. 837-840, Aug. 1975.

Tan, K. G. "Transformed High-Radix Division for High Performance Computers", IBM Technical Disclosure Bulletin, vol. 24, #11B, pp. 5812-5819, Apr. 1982.

WHERE: x INDICATES AN OVERLAP.

DIVIDE_TABLE.EXE

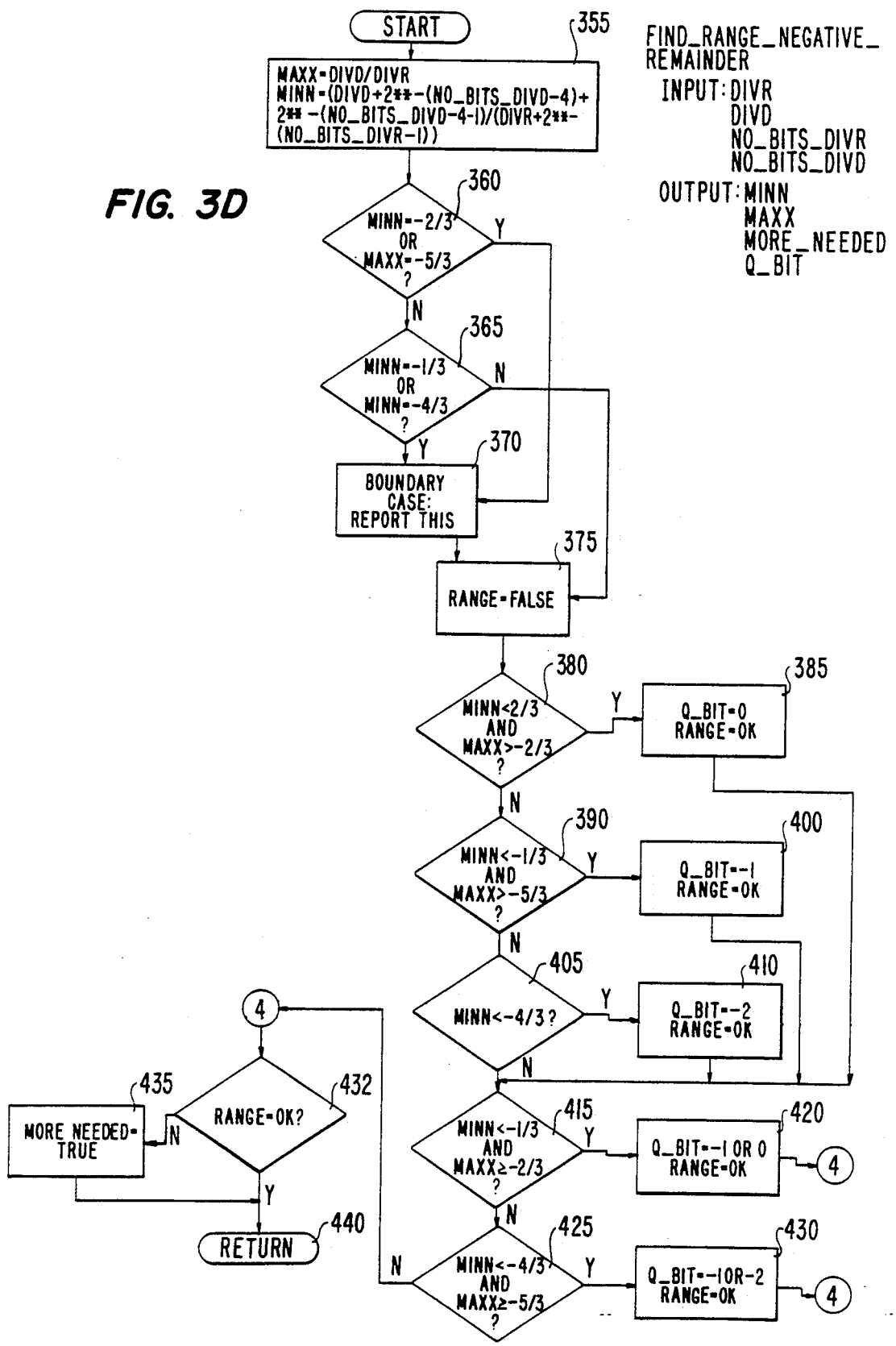

FIG. 4A

TABLE 1

Notes:  quot_val     - 10 indicates 1 or 0 is ok quotient value
        quot_val     - 21 indicates 2 or 1 is ok quotient value
        state_assgn  -  3 indicates binary state 1 or 0 is ok

| dividend octal | dividend decimal | divisor octal | divisor decimal | quot val | state assgn | min range 0 | max range 8/3 |
|---|---|---|---|---|---|---|---|
| 0  | 0.000 | 10 | 1.000 | 0  | 01 | 0.00000 | 0.18750 |
| 1  | 0.125 | 10 | 1.000 | 0  | 01 | 0.11111 | 0.31250 |
| 2  | 0.250 | 10 | 1.000 | 0  | 01 | 0.22222 | 0.43750 |
| 3  | 0.375 | 10 | 1.000 | 10 | 31 | 0.33333 | 0.56250 |
| 4  | 0.500 | 10 | 1.000 | 1  | 11 | 0.44444 | 0.68750 |
| 5  | 0.625 | 10 | 1.000 | 1  | 11 | 0.55556 | 0.81250 |
| 6  | 0.750 | 10 | 1.000 | 1  | 11 | 0.66667 | 0.93750 |
| 7  | 0.875 | 10 | 1.000 | 1  | 11 | 0.77778 | 1.06250 |
| 10 | 1.000 | 10 | 1.000 | 1  | 11 | 0.88889 | 1.10750 |
| 11 | 1.125 | 10 | 1.000 | 1  | 11 | 1.00000 | 1.31250 |
| 12 | 1.250 | 10 | 1.000 | 1  | 11 | 1.11111 | 1.43750 |
| 13 | 1.375 | 10 | 1.000 | 1  | 11 | 1.22222 | 1.56250 |
| 14 | 1.500 | 10 | 1.000 | 2  | 00 | 1.33333 | 1.68750 |
| 15 | 1.625 | 10 | 1.000 | 2  | 00 | 1.44444 | 1.61250 |
| 16 | 1.750 | 10 | 1.000 | 2  | 00 | 1.55556 | 1.93750 |
| 17 | 1.875 | 10 | 1.000 | 2  | 00 | 1.66667 | 2.06250 |
| 20 | 2.000 | 10 | 1.000 | 2  | 00 | 1.77778 | 2.16750 |
| 21 | 2.125 | 10 | 1.000 | 2  | 00 | 1.88889 | 2.31250 |
| 22 | 2.250 | 10 | 1.000 | 2  | 00 | 2.00000 | 2.43750 |
| 23 | 2.375 | 10 | 1.000 | 2  | 00 | 2.11111 | 2.56250 |
| 24 | 2.500 | 10 | 1.000 | 2  | 00 | 2.22222 | 2.68750 |
| 25 | 2.625 | 10 | 1.000 | 2  | 00 | 2.33333 | 2.81250 |
| 26 | 2.750 | 10 | 1.000 | 2  | 00 | 2.44444 | 2.93750 |
| 27 | 2.075 | 10 | 1.000 | 2  | 00 | 2.55556 | 3.06250 |
| 0  | 0.000 | 11 | 1.125 | 0  | 01 | 0.00000 | 0.16667 |
| 1  | 0.125 | 11 | 1.125 | 0  | 01 | 0.10000 | 0.27778 |
| 2  | 0.250 | 11 | 1.125 | 0  | 01 | 0.20000 | 0.38889 |
| 3  | 0.375 | 11 | 1.125 | 0  | 01 | 0.30000 | 0.50000 |
| 4  | 0.500 | 11 | 1.125 | 10 | 31 | 0.40000 | 0.61111 |
| 5  | 0.625 | 11 | 1.125 | 1  | 11 | 0.50000 | 0.72222 |
| 6  | 0.750 | 11 | 1.125 | 1  | 11 | 0.60000 | 0.83333 |
| 7  | 0.075 | 11 | 1.125 | 1  | 11 | 0.70000 | 0.94444 |
| 10 | 1.000 | 11 | 1.125 | 1  | 11 | 0.80000 | 1.05556 |
| 11 | 1.125 | 11 | 1.125 | 1  | 11 | 0.90000 | 1.16667 |
| 12 | 1.250 | 11 | 1.125 | 1  | 11 | 1.00000 | 1.27778 |
| 13 | 1.375 | 11 | 1.125 | 1  | 11 | 1.10000 | 1.38889 |
| 14 | 1.500 | 11 | 1.125 | 1  | 11 | 1.20000 | 1.50000 |
| 15 | 1.625 | 11 | 1.125 | 1  | 11 | 1.30000 | 1.61111 |
| 16 | 1.750 | 11 | 1.125 | 2  | 00 | 1.40000 | 1.72222 |
| 17 | 1.875 | 11 | 1.125 | 2  | 00 | 1.50000 | 1.83333 |
| 20 | 2.000 | 11 | 1.125 | 2  | 00 | 1.60000 | 1.94444 |
| 21 | 2.125 | 11 | 1.125 | 2  | 00 | 1.70000 | 2.05556 |

FIG. 4B

| dividend octal | dividend decimal | divisor octal | divisor decimal | quot val | state assgn | min range 0 | max range 8/3 |
|---|---|---|---|---|---|---|---|
| 22 | 2.250 | 11 | 1.125 | 2 | 00 | 1.80000 | 2.16667 |
| 23 | 2.375 | 11 | 1.125 | 2 | 00 | 1.90000 | 2.27778 |
| 24 | 2.500 | 11 | 1.125 | 2 | 00 | 2.00000 | 2.38889 |
| 25 | 2.625 | 11 | 1.125 | 2 | 00 | 2.10000 | 2.50000 |
| 26 | 2.750 | 11 | 1.125 | 2 | 00 | 2.20000 | 2.61111 |
| 27 | 2.875 | 11 | 1.125 | 2 | 00 | 2.30000 | 2.72222 |
| 30 | 3.000 | 11 | 1.125 | 2 | 00 | 2.40000 | 2.83333 |
| 31 | 3.125 | 11 | 1.125 | 2 | 00 | 2.50000 | 2.94444 |
| 32 | 3.250 | 11 | 1.125 | 2 | 00 | 2.60000 | 3.05556 |
| 0 | 0.000 | 12 | 1.250 | 0 | 01 | 0.00000 | 0.15000 |
| 1 | 1.125 | 12 | 1.250 | 0 | 01 | 0.09091 | 0.25000 |
| 2 | 0.250 | 12 | 1.250 | 0 | 01 | 0.18182 | 0.35000 |
| 3 | 0.375 | 12 | 1.250 | 0 | 01 | 0.27273 | 0.45000 |
| 4 | 0.500 | 12 | 1.250 | 10 | 31 | 0.36364 | 0.55000 |
| 5 | 0.625 | 12 | 1.250 | 10 | 31 | 0.45455 | 0.65000 |
| 6 | 0.750 | 12 | 1.250 | 1 | 11 | 0.54545 | 0.75000 |
| 7 | 0.850 | 12 | 1.250 | 1 | 11 | 0.63636 | 0.85000 |
| 10 | 1.000 | 12 | 1.250 | 1 | 11 | 0.72727 | 0.95000 |
| 11 | 1.125 | 12 | 1.250 | 1 | 11 | 0.81818 | 1.05000 |
| 12 | 1.250 | 12 | 1.250 | 1 | 11 | 0.90909 | 1.15000 |
| 13 | 1.375 | 12 | 1.250 | 1 | 11 | 1.00000 | 1.25000 |
| 14 | 1.500 | 12 | 1.250 | 1 | 11 | 1.09091 | 1.35000 |
| 15 | 1.625 | 12 | 1.250 | 1 | 11 | 1.18182 | 1.45000 |
| 16 | 1.750 | 12 | 1.250 | 1 | 11 | 1.27273 | 1.55000 |
| 17 | 1.875 | 12 | 1.250 | 12 | 33 | 1.36364 | 1.65000 |
| 20 | 2.000 | 12 | 1.250 | 2 | 00 | 1.45455 | 1.75000 |
| 21 | 2.125 | 12 | 1.250 | 2 | 00 | 1.54545 | 1.85000 |
| 22 | 2.250 | 12 | 1.250 | 2 | 00 | 1.63636 | 1.95000 |
| 23 | 2.375 | 12 | 1.250 | 2 | 00 | 1.72727 | 2.05000 |
| 24 | 2.500 | 12 | 1.250 | 2 | 00 | 1.81818 | 2.15000 |
| 25 | 2.625 | 12 | 1.250 | 2 | 00 | 1.90909 | 2.25000 |
| 26 | 2.750 | 12 | 1.250 | 2 | 00 | 2.00000 | 2.35000 |
| 27 | 2.875 | 12 | 1.250 | 2 | 00 | 2.09091 | 2.45000 |
| 30 | 3.000 | 12 | 1.250 | 2 | 00 | 2.18182 | 2.55000 |
| 31 | 3.125 | 12 | 1.250 | 2 | 00 | 2.27273 | 2.65000 |
| 32 | 3.250 | 12 | 1.250 | 2 | 00 | 2.36364 | 2.75000 |
| 33 | 3.375 | 12 | 1.250 | 2 | 00 | 2.45455 | 2.85000 |
| 34 | 3.500 | 12 | 1.250 | 2 | 00 | 2.54545 | 2.95000 |
| 35 | 3.625 | 12 | 1.250 | 2 | 00 | 2.63636 | 3.05000 |
| 0 | 0.000 | 13 | 1.375 | 2 | 01 | 0.00000 | 0.13636 |
| 1 | 0.125 | 13 | 1.375 | 2 | 01 | 0.08333 | 0.22727 |
| 2 | 0.250 | 13 | 1.375 | 2 | 01 | 0.16667 | 0.31818 |
| 3 | 0.375 | 13 | 1.375 | 0 | 01 | 0.25000 | 0.40909 |
| 4 | 0.500 | 13 | 1.375 | 10 | 31 | 0.33333 | 0.50000 |
| 5 | 0.625 | 13 | 1.375 | 10 | 31 | 0.41667 | 0.59091 |
| 6 | 0.750 | 13 | 1.375 | 1 | 11 | 0.50000 | 0.68182 |
| 7 | 0.875 | 13 | 1.375 | 1 | 11 | 0.58333 | 0.77273 |

FIG. 4C

| dividend octal | dividend decimal | divisor octal | divisor decimal | quot val | state assgn | min range 0 | max range → 8/3 |
|---|---|---|---|---|---|---|---|
| 10 | 1.000 | 13 | 1.375 | 1 | 11 | 0.66667 | 0.06364 |
| 11 | 1.125 | 13 | 1.375 | 1 | 11 | 0.75000 | 0.95455 |
| 12 | 1.250 | 13 | 1.375 | 1 | 11 | 0.83333 | 1.04545 |
| 13 | 1.375 | 13 | 1.375 | 1 | 11 | 0.91667 | 1.13636 |
| 14 | 1.500 | 13 | 1.375 | 1 | 11 | 1.00000 | 1.22727 |
| 15 | 1.625 | 13 | 1.375 | 1 | 11 | 1.08333 | 1.31818 |
| 16 | 1.750 | 13 | 1.375 | 1 | 11 | 1.16667 | 1.40909 |
| 17 | 1.875 | 13 | 1.375 | 1 | 11 | 1.25000 | 1.50000 |
| 20 | 2.000 | 13 | 1.375 | 12 | 33 | 1.33333 | 1.59091 |
| 21 | 2.175 | 13 | 1.375 | 2 | 00 | 1.41667 | 1.68182 |
| 22 | 2.250 | 13 | 1.375 | 2 | 00 | 1.50000 | 1.77273 |
| 23 | 2.375 | 13 | 1.375 | 2 | 00 | 1.58333 | 1.86364 |
| 24 | 2.500 | 13 | 1.375 | 2 | 00 | 1.66667 | 1.95455 |
| 25 | 2.625 | 13 | 1.375 | 2 | 00 | 1.75000 | 2.04545 |
| 26 | 2.750 | 13 | 1.375 | 2 | 00 | 1.83333 | 2.13636 |
| 27 | 2.675 | 13 | 1.375 | 2 | 00 | 1.91667 | 2.22727 |
| 30 | 3.000 | 13 | 1.375 | 2 | 00 | 2.00000 | 2.31818 |
| 31 | 3.125 | 13 | 1.375 | 2 | 00 | 2.08333 | 2.40909 |
| 32 | 3.250 | 13 | 1.375 | 2 | 00 | 2.16667 | 2.50000 |
| 33 | 3.375 | 13 | 1.375 | 2 | 00 | 2.25000 | 2.59091 |
| 34 | 3.500 | 13 | 1.375 | 2 | 00 | 2.33333 | 2.68182 |
| 35 | 3.625 | 13 | 1.375 | 2 | 00 | 2.41667 | 2.77273 |
| 36 | 3.750 | 13 | 1.375 | 2 | 00 | 2.50000 | 2.86364 |
| 37 | 3.875 | 13 | 1.375 | 2 | 00 | 2.58333 | 2.95455 |
| 0 | 0.000 | 14 | 1.500 | 0 | 01 | 0.00000 | 0.12500 |
| 1 | 0.125 | 14 | 1.500 | 0 | 01 | 0.07692 | 0.20833 |
| 2 | 0.250 | 14 | 1.500 | 0 | 01 | 0.15385 | 0.29167 |
| 3 | 0.375 | 14 | 1.500 | 0 | 01 | 0.23077 | 0.37500 |
| 4 | 0.500 | 14 | 1.500 | 0 | 01 | 0.30769 | 0.45833 |
| 5 | 0.625 | 14 | 1.500 | 10 | 31 | 0.38462 | 0.54167 |
| 6 | 0.750 | 14 | 1.500 | 10 | 31 | 0.66154 | 0.62500 |
| 7 | 0.875 | 14 | 1.500 | 1 | 11 | 0.53846 | 0.70833 |
| 10 | 1.000 | 14 | 1.500 | 1 | 11 | 0.61538 | 0.79167 |
| 11 | 1.125 | 14 | 1.500 | 1 | 11 | 0.69231 | 0.87500 |
| 12 | 1.250 | 14 | 1.500 | 1 | 11 | 0.76923 | 0.95833 |
| 13 | 1.375 | 14 | 1.500 | 1 | 11 | 0.84615 | 0.04167 |
| 14 | 1.500 | 14 | 1.500 | 1 | 11 | 0.92300 | 1.12500 |
| 15 | 1.625 | 14 | 1.500 | 1 | 11 | 1.00000 | 1.20833 |
| 16 | 1.750 | 14 | 1.500 | 1 | 11 | 1.07692 | 1.29167 |
| 17 | 1.875 | 14 | 1.500 | 1 | 11 | 1.15385 | 1.37500 |
| 20 | 2.000 | 14 | 1.500 | 1 | 11 | 1.23077 | 1.45833 |
| 21 | 2.125 | 14 | 1.500 | 1 | 11 | 1.30760 | 1.54167 |
| 22 | 2.250 | 14 | 1.500 | 12 | 33 | 1.38462 | 1.62500 |
| 23 | 2.375 | 14 | 1.500 | 2 | 00 | 1.46154 | 1.70033 |
| 24 | 2.500 | 14 | 1.500 | 2 | 00 | 1.53046 | 1.79167 |
| 25 | 2.625 | 14 | 1.500 | 2 | 00 | 1.61538 | 1.87500 |
| 26 | 2.750 | 14 | 1.500 | 2 | 00 | 1.69231 | 1.95833 |

FIG. 4D

| dividend octal | dividend decimal | divisor octal | divisor decimal | quot val | state assgn | min range 0 | max range 8/3 |
|---|---|---|---|---|---|---|---|
| 27 | 2.875 | 14 | 1.500 | 2 | 00 | 1.76923 | 2.04167 |
| 30 | 3.000 | 14 | 1.500 | 2 | 00 | 1.84615 | 2.12500 |
| 31 | 3.125 | 14 | 1.500 | 2 | 00 | 1.92308 | 2.20833 |
| 32 | 3.250 | 14 | 1.500 | 2 | 00 | 2.00000 | 2.29167 |
| 33 | 3.375 | 14 | 1.500 | 2 | 00 | 2.07692 | 2.37500 |
| 34 | 3.500 | 14 | 1.500 | 2 | 00 | 2.15385 | 2.45033 |
| 35 | 3.625 | 14 | 1.500 | 2 | 00 | 2.23077 | 2.54167 |
| 36 | 3.750 | 14 | 1.500 | 2 | 00 | 2.30769 | 2.62500 |
| 37 | 3.875 | 14 | 1.500 | 2 | 00 | 2.38462 | 2.70833 |
| 40 | 4.000 | 14 | 1.500 | 2 | 00 | 2.46154 | 2.79167 |
| 41 | 4.125 | 14 | 1.500 | 2 | 00 | 2.53846 | 2.87500 |
| 42 | 4.250 | 14 | 1.500 | 2 | 00 | 2.61538 | 2.95033 |
| 0 | 0.000 | 15 | 1.625 | 0 | 01 | 0.00000 | 0.11538 |
| 1 | 0.125 | 15 | 1.625 | 0 | 01 | 0.07143 | 0.19231 |
| 2 | 0.250 | 15 | 1.625 | 0 | 01 | 0.14286 | 0.26923 |
| 3 | 0.375 | 15 | 1.625 | 0 | 01 | 0.21429 | 0.34615 |
| 4 | 0.500 | 15 | 1.625 | 0 | 01 | 0.28571 | 0.42300 |
| 5 | 0.625 | 15 | 1.625 | 10 | 31 | 0.35714 | 0.50000 |
| 6 | 0.750 | 15 | 1.625 | 10 | 31 | 0.42857 | 0.57692 |
| 7 | 0.875 | 15 | 1.625 | 10 | 31 | 0.50000 | 0.65385 |
| 10 | 1.000 | 15 | 1.625 | 1 | 11 | 0.57143 | 0.73077 |
| 11 | 1.125 | 15 | 1.625 | 1 | 11 | 0.64286 | 0.80769 |
| 12 | 1.250 | 15 | 1.625 | 1 | 11 | 0.71429 | 0.88462 |
| 13 | 1.375 | 15 | 1.625 | 1 | 11 | 0.78571 | 0.96154 |
| 14 | 1.500 | 15 | 1.625 | 1 | 11 | 0.85714 | 1.03846 |
| 15 | 1.625 | 15 | 1.625 | 1 | 11 | 0.92857 | 1.11538 |
| 16 | 1.750 | 15 | 1.625 | 1 | 11 | 1.00000 | 1.19231 |
| 17 | 1.875 | 15 | 1.625 | 1 | 11 | 1.07143 | 1.26923 |
| 20 | 2.000 | 15 | 1.625 | 1 | 11 | 1.14286 | 1.34615 |
| 21 | 2.125 | 15 | 1.625 | 1 | 11 | 1.21429 | 1.42308 |
| 22 | 2.250 | 15 | 1.625 | 1 | 11 | 1.28571 | 1.50000 |
| 23 | 2.375 | 15 | 1.625 | 12 | 33 | 1.35714 | 1.57692 |
| 24 | 2.500 | 15 | 1.625 | 12 | 33 | 1.42857 | 1.65385 |
| 25 | 2.625 | 15 | 1.625 | 2 | 00 | 1.50000 | 1.73077 |
| 26 | 2.750 | 15 | 1.625 | 2 | 00 | 1.57143 | 1.80769 |
| 27 | 2.875 | 15 | 1.625 | 2 | 00 | 1.64286 | 1.88462 |
| 30 | 3.000 | 15 | 1.625 | 2 | 00 | 1.71429 | 1.96154 |
| 31 | 3.125 | 15 | 1.625 | 2 | 00 | 1.78671 | 2.03846 |
| 32 | 3.250 | 15 | 1.625 | 2 | 00 | 1.85714 | 2.11530 |
| 33 | 3.375 | 15 | 1.625 | 2 | 00 | 1.92857 | 2.19231 |
| 34 | 3.500 | 15 | 1.625 | 2 | 00 | 2.00000 | 2.26923 |
| 35 | 3.625 | 15 | 1.625 | 2 | 00 | 2.07143 | 2.34615 |
| 36 | 3.750 | 15 | 1.625 | 2 | 00 | 2.14286 | 2.42308 |
| 37 | 3.875 | 15 | 1.625 | 2 | 00 | 2.21429 | 2.50000 |
| 40 | 4.000 | 15 | 1.625 | 2 | 00 | 2.28571 | 2.57692 |
| 41 | 4.125 | 15 | 1.625 | 2 | 00 | 2.35714 | 2.65385 |
| 42 | 4.250 | 15 | 1.625 | 2 | 00 | 2.42857 | 2.73077 |

FIG. 4E

| dividend octal | dividend decimal | divisor octal | divisor decimal | quot val | state assgn | min range 0 | max range ---> 8/3 |
|---|---|---|---|---|---|---|---|
| 43 | 4.375 | 15 | 1.625 | 2 | 00 | 2.50000 | 2.80769 |
| 44 | 4.500 | 15 | 1.625 | 2 | 00 | 2.57143 | 2.88462 |
| 45 | 4.625 | 15 | 1.625 | 2 | 00 | 2.64286 | 2.96154 |
| 0 | 0.000 | 16 | 1.750 | 0 | 01 | 0.00000 | 0.10714 |
| 1 | 0.125 | 16 | 1.750 | 0 | 01 | 0.06667 | 0.17057 |
| 2 | 0.250 | 16 | 1.750 | 0 | 01 | 0.13333 | 0.25000 |
| 3 | 0.375 | 16 | 1.750 | 0 | 01 | 0.20000 | 0.32143 |
| 4 | 0.500 | 16 | 1.750 | 0 | 01 | 0.26667 | 0.39286 |
| 5 | 0.625 | 16 | 1.750 | 10 | 31 | 0.33333 | 0.46429 |
| 6 | 0.750 | 16 | 1.750 | 10 | 31 | 0.40000 | 0.53571 |
| 7 | 0.875 | 16 | 1.750 | 10 | 31 | 0.46667 | 0.60714 |
| 10 | 1.000 | 16 | 1.750 | 1 | 11 | 0.53333 | 0.67857 |
| 11 | 1.125 | 16 | 1.750 | 1 | 11 | 0.60000 | 0.75000 |
| 12 | 1.250 | 16 | 1.750 | 1 | 11 | 0.66667 | 0.82143 |
| 13 | 1.375 | 16 | 1.750 | 1 | 11 | 0.73333 | 0.89285 |
| 14 | 1.500 | 16 | 1.750 | 1 | 11 | 0.80000 | 0.96429 |
| 15 | 1.625 | 16 | 1.750 | 1 | 11 | 0.86667 | 1.03571 |
| 16 | 1.750 | 16 | 1.750 | 1 | 11 | 0.93333 | 1.10714 |
| 17 | 1.875 | 16 | 1.750 | 1 | 11 | 1.00000 | 1.17057 |
| 20 | 2.000 | 16 | 1.750 | 1 | 11 | 1.06667 | 1.25000 |
| 21 | 2.125 | 16 | 1.750 | 1 | 11 | 1.13333 | 1.32143 |
| 22 | 2.250 | 16 | 1.750 | 1 | 11 | 1.20000 | 1.39286 |
| 23 | 2.375 | 16 | 1.750 | 1 | 11 | 1.26667 | 1.46423 |
| 24 | 2.500 | 16 | 1.750 | 12 | 33 | 1.33333 | 1.53571 |
| 25 | 2.625 | 16 | 1.750 | 12 | 33 | 1.40000 | 1.60714 |
| 26 | 2.750 | 16 | 1.750 | 2 | 00 | 1.46667 | 1.67857 |
| 27 | 2.875 | 16 | 1.750 | 2 | 00 | 1.53333 | 1.75000 |
| 30 | 3.000 | 16 | 1.750 | 2 | 00 | 1.60000 | 1.82143 |
| 31 | 3.125 | 16 | 1.750 | 2 | 00 | 1.66667 | 1.89286 |
| 32 | 3.250 | 16 | 1.750 | 2 | 00 | 1.73333 | 1.96429 |
| 33 | 3.375 | 16 | 1.750 | 2 | 00 | 1.80000 | 2.03571 |
| 34 | 3.500 | 16 | 1.750 | 2 | 00 | 1.86667 | 2.10714 |
| 35 | 3.625 | 16 | 1.750 | 2 | 00 | 1.93333 | 2.17857 |
| 36 | 3.750 | 16 | 1.750 | 2 | 00 | 2.00000 | 2.25000 |
| 37 | 3.875 | 16 | 1.750 | 2 | 00 | 2.06667 | 2.32143 |
| 40 | 4.000 | 16 | 1.750 | 2 | 00 | 2.13333 | 2.39286 |
| 41 | 4.125 | 16 | 1.750 | 2 | 00 | 2.20000 | 2.46429 |
| 42 | 4.250 | 16 | 1.750 | 2 | 00 | 2.26667 | 2.53571 |
| 43 | 4.375 | 16 | 1.750 | 2 | 00 | 2.33333 | 2.60714 |
| 44 | 4.500 | 16 | 1.750 | 2 | 00 | 2.40000 | 2.67857 |
| 45 | 4.625 | 16 | 1.750 | 2 | 00 | 2.46667 | 2.75000 |
| 46 | 4.750 | 16 | 1.750 | 2 | 00 | 2.53333 | 2.82143 |
| 47 | 4.875 | 16 | 1.750 | 2 | 00 | 2.60000 | 2.89286 |
| 0 | 0.000 | 17 | 1.875 | 0 | 01 | 0.00000 | 0.10000 |
| 1 | 0.125 | 17 | 1.875 | 0 | 01 | 0.06250 | 0.16667 |
| 2 | 0.250 | 17 | 1.875 | 0 | 01 | 0.12500 | 0.23333 |
| 3 | 0.375 | 17 | 1.875 | 0 | 01 | 0.18750 | 0.30000 |

FIG. 4F

| dividend octal | dividend decimal | divisor octal | divisor decimal | quot val | state assgn | min range 0 | max range ⟶ 8/3 |
|---|---|---|---|---|---|---|---|
| 4 | 0.500 | 17 | 1.875 | 0 | 01 | 0.25000 | 0.36667 |
| 5 | 0.625 | 17 | 1.875 | 0 | 01 | 0.31250 | 0.43333 |
| 6 | 0.750 | 17 | 1.875 | 10 | 31 | 0.37500 | 0.50000 |
| 7 | 0.875 | 17 | 1.875 | 10 | 31 | 0.43750 | 0.56667 |
| 10 | 1.000 | 17 | 1.875 | 10 | 31 | 0.50000 | 0.63333 |
| 11 | 1.125 | 17 | 1.875 | 1 | 11 | 0.56250 | 0.70000 |
| 12 | 1.250 | 17 | 1.875 | 1 | 11 | 0.62500 | 0.76667 |
| 13 | 1.375 | 17 | 1.875 | 1 | 11 | 0.68750 | 0.83333 |
| 14 | 1.500 | 17 | 1.875 | 1 | 11 | 0.75000 | 0.90000 |
| 15 | 1.625 | 17 | 1.875 | 1 | 11 | 0.81250 | 0.96667 |
| 16 | 1.750 | 17 | 1.875 | 1 | 11 | 0.87500 | 1.03333 |
| 17 | 1.875 | 17 | 1.875 | 1 | 11 | 0.93750 | 1.10000 |
| 20 | 2.000 | 17 | 1.875 | 1 | 11 | 1.00000 | 1.16667 |
| 21 | 2.125 | 17 | 1.875 | 1 | 11 | 1.06250 | 1.23333 |
| 22 | 2.250 | 17 | 1.875 | 1 | 11 | 1.12500 | 1.30000 |
| 23 | 2.375 | 17 | 1.875 | 1 | 11 | 1.18750 | 1.36667 |
| 24 | 2.500 | 17 | 1.875 | 1 | 11 | 1.25000 | 1.43333 |
| 25 | 2.625 | 17 | 1.875 | 1 | 11 | 1.31250 | 1.50000 |
| 26 | 2.750 | 17 | 1.875 | 12 | 33 | 1.37500 | 1.56667 |
| 27 | 2.875 | 17 | 1.875 | 12 | 33 | 1.43750 | 1.63333 |
| 30 | 3.000 | 17 | 1.875 | 2 | 00 | 1.50000 | 1.70000 |
| 31 | 3.125 | 17 | 1.875 | 2 | 00 | 1.56250 | 1.76667 |
| 32 | 3.250 | 17 | 1.875 | 2 | 00 | 1.62500 | 1.83333 |
| 33 | 3.375 | 17 | 1.875 | 2 | 00 | 1.68750 | 1.90000 |
| 34 | 3.500 | 17 | 1.875 | 2 | 00 | 1.75000 | 1.96667 |
| 35 | 3.625 | 17 | 1.875 | 2 | 00 | 1.81250 | 2.03333 |
| 36 | 3.750 | 17 | 1.875 | 2 | 00 | 1.87500 | 2.10000 |
| 37 | 3.875 | 17 | 1.875 | 2 | 00 | 1.93750 | 2.16667 |
| 40 | 4.000 | 17 | 1.875 | 2 | 00 | 2.00000 | 2.23333 |
| 41 | 4.125 | 17 | 1.875 | 2 | 00 | 2.06250 | 2.30000 |
| 42 | 4.250 | 17 | 1.875 | 2 | 00 | 2.12500 | 2.36667 |
| 43 | 4.375 | 17 | 1.875 | 2 | 00 | 2.18750 | 2.43333 |
| 44 | 4.500 | 17 | 1.875 | 2 | 00 | 2.25000 | 2.50000 |
| 45 | 4.625 | 17 | 1.875 | 2 | 00 | 2.31250 | 2.56667 |
| 46 | 4.750 | 17 | 1.875 | 2 | 00 | 2.37500 | 2.63333 |
| 47 | 4.875 | 17 | 1.875 | 2 | 00 | 2.43750 | 2.70000 |
| 50 | 5.000 | 17 | 1.875 | 2 | 00 | 2.50000 | 2.76667 |
| 51 | 5.125 | 17 | 1.875 | 2 | 00 | 2.56250 | 2.83333 |
| 52 | 5.250 | 17 | 1.875 | 2 | 00 | 2.62500 | 2.90000 |

FIG. 4G

| dividend octal | dividend decimal | divisor octal | divisor decimal | quot val | state assgn | max range 0 ← | min range 8/3 |
|---:|---:|---:|---:|---:|---:|---:|---:|
| 0 | 0.000 | 10 | 1.000 | 0 | 01 | 0.16667 | 0.00000 |
| 177 | -0.125 | 10 | 1.000 | 0 | 01 | 0.05556 | -0.12500 |
| 176 | -0.250 | 10 | 1.000 | 0 | 01 | -0.05556 | -0.25000 |
| 175 | -0.375 | 10 | 1.000 | 0 | 01 | -0.16667 | -0.37500 |
| 174 | -0.500 | 10 | 1.000 | 0 | 01 | -0.27778 | -0.50000 |
| 173 | -0.625 | 10 | 1.000 | -10 | 31 | -0.38889 | -0.62500 |
| 172 | -0.750 | 10 | 1.000 | -1 | 11 | -0.50000 | -0.75000 |
| 171 | -0.875 | 10 | 1.000 | -1 | 11 | -0.61111 | -0.67500 |
| 170 | -1.000 | 10 | 1.000 | -1 | 11 | -0.72222 | -1.00000 |
| 167 | -1.125 | 10 | 1.000 | -1 | 11 | -0.63333 | -1.12500 |
| 166 | -1.250 | 10 | 1.000 | -1 | 11 | -0.94444 | -1.25000 |
| 165 | -1.375 | 10 | 1.000 | -1 | 11 | -1.05556 | -1.37500 |
| 164 | -1.500 | 10 | 1.000 | -1 | 11 | -1.16667 | -1.50000 |
| 163 | -1.625 | 10 | 1.000 | -1 | 11 | -1.27770 | -1.62500 |
| 162 | -1.750 | 10 | 1.000 | -2 | 00 | -1.38889 | -1.75000 |
| 161 | -1.875 | 10 | 1.000 | -2 | 00 | -1.50000 | -1.87500 |
| 160 | -2.000 | 10 | 1.000 | -2 | 00 | -1.61111 | -2.00000 |
| 157 | -2.125 | 10 | 1.000 | -2 | 00 | -1.72222 | -2.12500 |
| 156 | -2.250 | 10 | 1.000 | -2 | 00 | -1.83333 | -2.25000 |
| 155 | -2.375 | 10 | 1.000 | -2 | 00 | -1.94444 | -2.37500 |
| 154 | -2.500 | 10 | 1.000 | -2 | 00 | -2.05556 | -2.50000 |
| 153 | -2.625 | 10 | 1.000 | -2 | 00 | -2.16667 | -2.62500 |
| 152 | -2.750 | 10 | 1.000 | -2 | 00 | -2.27770 | -2.75000 |
| 151 | -2.875 | 10 | 1.000 | -2 | 00 | -2.38889 | -2.87500 |
| 150 | -3.000 | 10 | 1.000 | -2 | 00 | -2.50000 | -2.00000 |
| 147 | -3.125 | 10 | 1.000 | -2 | 00 | -2.61111 | -3.12500 |
| 0 | -0.000 | 11 | 1.125 | 0 | 01 | -0.15000 | -0.00000 |
| 177 | -0.125 | 11 | 1.125 | 0 | 01 | -0.05000 | -0.11111 |
| 176 | -0.250 | 11 | 1.125 | 0 | 01 | -0.05000 | -0.22222 |
| 175 | -0.375 | 11 | 1.125 | 0 | 01 | -0.15000 | -0.33333 |
| 174 | -0.500 | 11 | 1.125 | 0 | 01 | -0.25000 | -0.44444 |
| 173 | -0.625 | 11 | 1.125 | -10 | 31 | -0.35000 | -0.55556 |
| 172 | -0.750 | 11 | 1.125 | -10 | 31 | -0.45000 | -0.66667 |
| 171 | -0.875 | 11 | 1.125 | -1 | 11 | -0.55000 | -0.77778 |
| 170 | -1.000 | 11 | 1.125 | -1 | 11 | -0.65000 | -0.68889 |
| 167 | -1.125 | 11 | 1.125 | -1 | 11 | -0.75000 | -1.10000 |
| 166 | -1.250 | 11 | 1.125 | -1 | 11 | -0.85000 | -1.11111 |
| 165 | -1.375 | 11 | 1.125 | -1 | 11 | -0.95000 | -1.22222 |
| 164 | -1.500 | 11 | 1.125 | -1 | 11 | -1.05000 | -1.33333 |
| 163 | -1.625 | 11 | 1.125 | -1 | 11 | -1.15000 | -1.44444 |
| 162 | -1.750 | 11 | 1.125 | -1 | 11 | -1.25000 | -1.55556 |
| 161 | -1.875 | 11 | 1.125 | -12 | 33 | -1.35000 | -1.66667 |
| 160 | -2.000 | 11 | 1.125 | -2 | 00 | -1.45000 | -1.77778 |
| 157 | -2.125 | 11 | 1.125 | -2 | 00 | -1.55000 | -1.88889 |
| 156 | -2.250 | 11 | 1.125 | -2 | 00 | -1.65000 | -2.00000 |
| 155 | -2.375 | 11 | 1.125 | -2 | 00 | -1.75000 | -2.11111 |

FIG. 4H

| dividend octal | dividend decimal | divisor octal | divisor decimal | quot val | state assgn | max range 0 ◄------- | min range 8/3 |
|---|---|---|---|---|---|---|---|
| 154 | -2.500 | 11 | 1.125 | -2 | 00 | -1.85000 | -2.22222 |
| 153 | -2.625 | 11 | 1.125 | -2 | 00 | -1.95000 | -2.33333 |
| 152 | -2.750 | 11 | 1.125 | -2 | 00 | -2.05000 | -2.44444 |
| 151 | -2.875 | 11 | 1.125 | -2 | 00 | -2.15000 | -2.55556 |
| 150 | -3.000 | 11 | 1.125 | -2 | 00 | -2.25000 | -2.66667 |
| 147 | -3.125 | 11 | 1.125 | -2 | 00 | -2.35000 | -2.77778 |
| 146 | -3.250 | 11 | 1.125 | -2 | 00 | -2.45000 | -2.88889 |
| 145 | -3.375 | 11 | 1.125 | -2 | 00 | -2.55000 | -3.00000 |
| 144 | -3.500 | 11 | 1.125 | -2 | 00 | -2.65000 | -3.11111 |
| 0 | -0.000 | 12 | 1.250 | 0 | 01 | 0.13636 | 0.00000 |
| 177 | -0.125 | 12 | 1.250 | 0 | 01 | 0.04545 | -0.10000 |
| 176 | -0.250 | 12 | 1.250 | 0 | 01 | 0.04545 | -0.20000 |
| 175 | -0.375 | 12 | 1.250 | 0 | 01 | 0.13636 | -0.30000 |
| 174 | -0.500 | 12 | 1.250 | 0 | 01 | 0.22727 | -0.40000 |
| 173 | -0.625 | 12 | 1.250 | 0 | 01 | 0.31010 | -0.50000 |
| 172 | -0.750 | 12 | 1.250 | -10 | 31 | 0.40909 | -0.60000 |
| 171 | -0.875 | 12 | 1.250 | -1 | 11 | 0.50000 | -0.70000 |
| 170 | -1.000 | 12 | 1.250 | -1 | 11 | 0.59091 | -0.80000 |
| 167 | -1.125 | 12 | 1.250 | -1 | 11 | 0.68182 | -0.90000 |
| 166 | -1.250 | 12 | 1.250 | -1 | 11 | 0.77273 | -1.00000 |
| 165 | -1.375 | 12 | 1.250 | -1 | 11 | 0.86364 | -1.10000 |
| 164 | -1.500 | 12 | 1.250 | -1 | 11 | 0.95455 | -1.20000 |
| 163 | -1.625 | 12 | 1.250 | -1 | 11 | 0.04545 | -1.30000 |
| 162 | -1.750 | 12 | 1.250 | -1 | 11 | 0.13636 | -1.40000 |
| 161 | -1.875 | 12 | 1.250 | -1 | 11 | 0.22727 | -1.50000 |
| 160 | -2.000 | 12 | 1.250 | -1 | 11 | 1.31818 | -1.60000 |
| 157 | -2.125 | 12 | 1.250 | -2 | 00 | 1.40909 | -1.70000 |
| 156 | -2.250 | 12 | 1.250 | -2 | 00 | 1.50000 | -1.80000 |
| 155 | -2.375 | 12 | 1.250 | -2 | 00 | 1.59091 | -1.90000 |
| 154 | -2.500 | 12 | 1.250 | -2 | 00 | 1.68182 | -2.00000 |
| 153 | -2.625 | 12 | 1.250 | -2 | 00 | 1.77273 | -2.10000 |
| 152 | -2.750 | 12 | 1.250 | -2 | 00 | 1.86364 | -2.20000 |
| 151 | -2.075 | 12 | 1.250 | -2 | 00 | 1.95455 | -2.30000 |
| 150 | -3.000 | 12 | 1.250 | -2 | 00 | 2.04545 | -2.40000 |
| 147 | -3.125 | 12 | 1.250 | -2 | 00 | 2.13636 | -2.50000 |
| 146 | -3.250 | 12 | 1.250 | -2 | 00 | 2.22727 | -2.60000 |
| 145 | -3.375 | 12 | 1.250 | -2 | 00 | 2.31818 | -2.70000 |
| 144 | -3.500 | 12 | 1.250 | -2 | 00 | 2.40909 | -2.80000 |
| 143 | -3.625 | 12 | 1.250 | -2 | 00 | 2.50000 | -2.90000 |
| 142 | -3.750 | 12 | 1.250 | -2 | 00 | 2.59091 | -3.00000 |
| 0 | -0.000 | 13 | 1.375 | 0 | 01 | 0.12500 | -0.00000 |
| 177 | -0.125 | 13 | 1.375 | 0 | 01 | 0.04167 | -0.09091 |
| 176 | -0.250 | 13 | 1.375 | 0 | 01 | 0.04167 | -0.18182 |
| 175 | -0.375 | 13 | 1.375 | 0 | 01 | 0.12500 | -0.27273 |
| 174 | -0.500 | 13 | 1.375 | 0 | 01 | 0.20833 | -0.36364 |
| 173 | -0.625 | 13 | 1.375 | 0 | 01 | 0.29167 | -0.45455 |
| 172 | -0.750 | 13 | 1.375 | -10 | 31 | 0.37500 | -0.54545 |
| 171 | -0.875 | 13 | 1.375 | -10 | 31 | 0.45833 | -0.63636 |
| 170 | -1.000 | 13 | 1.375 | -1 | 11 | 0.54167 | -0.72727 |
| 167 | -1.125 | 13 | 1.375 | -1 | 11 | 0.62500 | -0.81818 |
| 166 | -1.250 | 13 | 1.375 | -1 | 11 | 0.70833 | -0.90909 |

FIG. 4I

| dividend octal | dividend decimal | divisor octal | divisor decimal | quot val | state assgn | max range 0 ⟵------- | min range 8/3 |
|---|---|---|---|---|---|---|---|
| 165 | -1.375 | 13 | 1.375 | -1 | 11 | 0.79167 | -1.00000 |
| 164 | -1.500 | 13 | 1.375 | -1 | 11 | 0.87500 | -1.09091 |
| 163 | -1.625 | 13 | 1.375 | -1 | 11 | 0.95033 | -1.10102 |
| 162 | -1.750 | 13 | 1.375 | -1 | 11 | 1.04167 | -1.27273 |
| 161 | -1.875 | 13 | 1.375 | -1 | 11 | 1.12500 | -1.36364 |
| 160 | -2.000 | 13 | 1.375 | -1 | 11 | 1.20833 | -1.45455 |
| 157 | -2.125 | 13 | 1.375 | -1 | 11 | 1.29167 | -1.54545 |
| 156 | -2.250 | 13 | 1.375 | -12 | 33 | 1.37500 | -1.63636 |
| 155 | -2.375 | 13 | 1.375 | -2 | 00 | 1.45833 | -1.72727 |
| 154 | -2.500 | 13 | 1.375 | -2 | 00 | 1.54167 | -1.81818 |
| 153 | -2.625 | 13 | 1.375 | -2 | 00 | 1.62500 | -1.90909 |
| 152 | -2.750 | 13 | 1.375 | -2 | 00 | 1.70833 | -2.00000 |
| 151 | -2.875 | 13 | 1.375 | -2 | 00 | 1.79167 | -2.09031 |
| 150 | -3.000 | 13 | 1.375 | -2 | 00 | 1.87500 | -2.18182 |
| 147 | -3.125 | 13 | 1.375 | -2 | 00 | 1.95833 | -2.27273 |
| 146 | -3.250 | 13 | 1.375 | -2 | 00 | 2.04167 | -2.36364 |
| 145 | -3.375 | 13 | 1.375 | -2 | 00 | -2.12500 | -2.45455 |
| 144 | -3.500 | 13 | 1.375 | -2 | 00 | -2.20833 | -2.54545 |
| 143 | -3.625 | 13 | 1.375 | -2 | 00 | -2.29167 | -2.63636 |
| 142 | -3.750 | 13 | 1.375 | -2 | 00 | -2.37500 | -2.72727 |
| 141 | -3.875 | 13 | 1.375 | -2 | 00 | -2.45833 | -2.81818 |
| 140 | -4.000 | 13 | 1.375 | -2 | 00 | -2.54167 | -2.90909 |
| 137 | -4.125 | 13 | 1.375 | -2 | 00 | -2.62500 | -3.00000 |
| 0 | 0.000 | 14 | 1.500 | 0 | 01 | 0.11538 | 0.00000 |
| 177 | -0.125 | 14 | 1.500 | 0 | 02 | 0.03646 | -0.08333 |
| 176 | -0.250 | 14 | 1.500 | 0 | 01 | -0.03846 | -0.16667 |
| 175 | -0.375 | 14 | 1.500 | 0 | 01 | -0.11538 | -0.25000 |
| 174 | -0.500 | 14 | 1.500 | 0 | 01 | -0.19231 | -0.33333 |
| 173 | -0.625 | 14 | 1.500 | 0 | 01 | -0.26923 | -0.41667 |
| 172 | -0.750 | 14 | 1.500 | -10 | 31 | -0.34615 | -0.50000 |
| 171 | -0.875 | 14 | 1.500 | -10 | 31 | -0.42308 | -0.56333 |
| 170 | -1.000 | 14 | 1.500 | -10 | 31 | -0.50000 | -0.66667 |
| 167 | -1.125 | 14 | 1.500 | -1 | 11 | -0.57692 | -0.75000 |
| 166 | -1.250 | 14 | 1.500 | -1 | 11 | -0.65385 | -0.83333 |
| 165 | -1.375 | 14 | 1.500 | -1 | 11 | -0.73077 | -0.91667 |
| 164 | -1.500 | 14 | 1.500 | -1 | 11 | -0.80769 | -1.00000 |
| 163 | -1.625 | 14 | 1.500 | -1 | 11 | -0.88462 | -1.08333 |
| 162 | -1.750 | 14 | 1.500 | -1 | 11 | -0.96154 | -1.66667 |
| 161 | -1.875 | 14 | 1.500 | -1 | 11 | -1.03846 | -1.25000 |
| 160 | -2.000 | 14 | 1.500 | -1 | 11 | -1.11538 | -1.33333 |
| 157 | -2.125 | 14 | 1.500 | -1 | 11 | -1.19231 | -1.41667 |
| 156 | -2.250 | 14 | 1.500 | -1 | 11 | -1.26923 | -1.50000 |
| 155 | -2.375 | 14 | 1.500 | -12 | 33 | -1.34615 | -1.58333 |
| 154 | -2.300 | 14 | 1.500 | -12 | 33 | -1.42308 | -1.66667 |
| 153 | -2.625 | 14 | 1.500 | -2 | 00 | -1.50000 | -1.75000 |
| 152 | -2.750 | 14 | 1.500 | -2 | 00 | -1.57692 | -1.83333 |
| 151 | -2.675 | 14 | 1.500 | -2 | 00 | -1.65385 | -1.91667 |

FIG. 4J

| dividend octal | dividend decimal | divisor octal | divisor decimal | quot val | state assgn | max range -8/3 ← | min range 0 |
|---|---|---|---|---|---|---|---|
| 150 | -3.000 | 14 | 1.500 | -2 | 00 | -1.73077 | -2.00000 |
| 147 | -3.125 | 14 | 1.500 | -2 | 00 | -1.80769 | -2.08333 |
| 146 | -3.250 | 14 | 1.500 | -2 | 00 | -1.88461 | 2.16667 |
| 145 | -3.375 | 14 | 1.500 | -2 | 00 | -1.96154 | -2.25000 |
| 144 | -3.500 | 14 | 1.500 | -2 | 00 | -2.03646 | -2.33333 |
| 143 | -3.625 | 14 | 1.500 | -2 | 00 | -2.11538 | -2.41667 |
| 142 | -3.750 | 14 | 1.500 | -2 | 00 | -2.19231 | -2.50000 |
| 141 | -3.875 | 14 | 1.500 | -2 | 00 | -2.26923 | -2.58333 |
| 140 | -4.000 | 14 | 1.500 | -2 | 00 | -2.34615 | -2.66667 |
| 137 | -4.125 | 14 | 1.500 | -2 | 00 | -2.42308 | -2.75000 |
| 136 | -4.250 | 14 | 1.500 | -2 | 00 | -2.50000 | -2.83333 |
| 135 | -4.375 | 14 | 1.500 | -2 | 00 | -2.57682 | -2.91667 |
| 134 | -4.500 | 14 | 1.500 | -2 | 00 | -2.65383 | -3.00000 |
| 0 | 0.000 | 15 | 1.625 | 0 | 01 | 0.10714 | 0.00000 |
| 177 | -0.125 | 15 | 1.625 | 0 | 01 | -0.03571 | -0.07692 |
| 176 | -0.250 | 15 | 1.625 | 0 | 01 | -0.03571 | -0.15385 |
| 175 | -0.375 | 15 | 1.625 | 0 | 01 | -0.10714 | -0.23077 |
| 174 | -0.500 | 15 | 1.625 | 0 | 01 | -0.17857 | -0.30769 |
| 173 | -0.625 | 15 | 1.625 | 0 | 01 | -0.25000 | -0.38462 |
| 172 | -0.750 | 15 | 1.625 | 0 | 01 | -0.32143 | -0.46154 |
| 171 | -0.875 | 15 | 1.625 | -10 | 31 | -0.39286 | -0.53846 |
| 170 | -1.000 | 15 | 1.625 | -10 | 31 | -0.06429 | -0.61538 |
| 167 | -1.125 | 15 | 1.625 | -1 | 11 | -0.53571 | -0.69231 |
| 166 | -1.250 | 15 | 1.625 | -1 | 11 | -0.60714 | -0.76923 |
| 165 | -1.375 | 15 | 1.625 | -1 | 11 | -0.67857 | -0.84615 |
| 164 | -1.500 | 15 | 1.625 | -1 | 11 | -0.75000 | -0.92308 |
| 163 | -1.625 | 15 | 1.625 | -1 | 11 | -0.82143 | -1.00000 |
| 162 | -1.750 | 15 | 1.625 | -1 | 11 | -0.89286 | -1.07692 |
| 161 | -1.875 | 15 | 1.625 | -1 | 11 | -0.96429 | -1.15385 |
| 160 | -2.000 | 15 | 1.625 | -1 | 11 | -1.03571 | -1.23077 |
| 157 | -2.125 | 15 | 1.625 | -1 | 11 | -1.10714 | -1.30769 |
| 156 | -2.250 | 15 | 1.625 | -1 | 11 | -1.17857 | -1.30462 |
| 155 | -2.375 | 15 | 1.625 | -1 | 11 | -1.25000 | -1.46154 |
| 154 | -2.500 | 15 | 1.625 | -1 | 11 | -1.32143 | -1.53866 |
| 153 | -2.625 | 15 | 1.625 | -12 | 33 | -1.39286 | -1.61538 |
| 152 | -2.750 | 15 | 1.625 | -2 | 00 | -1.46429 | -1.69231 |
| 151 | -2.875 | 15 | 1.625 | -2 | 00 | -1.53571 | -1.76923 |
| 150 | -3.000 | 15 | 1.625 | -2 | 00 | -1.60714 | -1.84615 |
| 147 | -3.125 | 15 | 1.625 | -2 | 00 | -1.67857 | -1.92308 |
| 146 | -3.250 | 15 | 1.625 | -2 | 00 | -1.75000 | -2.00000 |
| 145 | -3.375 | 15 | 1.625 | -2 | 00 | -1.82143 | -2.07692 |
| 144 | -3.500 | 15 | 1.625 | -2 | 00 | -1.89286 | -2.15385 |
| 143 | -3.625 | 15 | 1.625 | -2 | 00 | -1.96429 | -2.23077 |
| 142 | -3.750 | 15 | 1.625 | -2 | 00 | -2.03571 | -2.30769 |
| 141 | -3.875 | 15 | 1.625 | -2 | 00 | -2.10714 | -2.36462 |
| 140 | -4.000 | 15 | 1.625 | -2 | 00 | -2.17857 | -2.46154 |
| 137 | -4.125 | 15 | 1.625 | -2 | 00 | -2.25000 | -2.53846 |
| 136 | -4.250 | 15 | 1.625 | -2 | 00 | -2.32143 | -2.61538 |
| 135 | -4.375 | 15 | 1.625 | -2 | 00 | -2.39286 | -2.69231 |
| 134 | -4.500 | 15 | 1.625 | -2 | 00 | -2.46429 | -2.76923 |

FIG. 4K

| dividend octal | dividend decimal | divisor octal | divisor decimal | quot val | state assgn | max range −8/3 ⪕------- | min range 0 |
|---|---|---|---|---|---|---|---|
| 133 | −4.625 | 15 | 1.625 | −2 | 00 | −2.53571 | −2.04615 |
| 132 | −4.750 | 15 | 1.625 | −2 | 00 | −2.60714 | −2.92308 |
| 0 | 0.000 | 16 | 1.750 | 0 | 01 | 0.10000 | 0.00000 |
| 177 | −0.125 | 16 | 1.750 | 0 | 01 | 0.03333 | −0.07143 |
| 176 | −0.250 | 16 | 1.750 | 0 | 01 | −0.03333 | −0.14286 |
| 175 | −0.375 | 16 | 1.750 | 0 | 01 | −0.10000 | −0.21429 |
| 174 | −0.500 | 16 | 1.750 | 0 | 01 | −0.16667 | −0.28571 |
| 173 | −0.625 | 16 | 1.750 | 0 | 01 | −0.23333 | −0.35714 |
| 172 | −0.750 | 16 | 1.750 | 0 | 01 | −0.30000 | −0.42857 |
| 171 | −0.875 | 16 | 1.750 | −10 | 31 | −0.66667 | −0.50000 |
| 170 | −1.000 | 16 | 1.750 | −10 | 31 | −0.43333 | −0.57143 |
| 167 | −1.125 | 16 | 1.750 | −10 | 31 | −0.50000 | −0.64286 |
| 166 | −1.250 | 16 | 1.750 | −1 | 11 | −0.56667 | −0.71429 |
| 165 | −1.375 | 16 | 1.750 | −1 | 11 | −0.63333 | −0.78571 |
| 164 | −1.500 | 16 | 1.750 | −1 | 11 | −0.70000 | −0.85714 |
| 163 | −1.625 | 16 | 1.750 | −1 | 11 | −0.76667 | −0.92857 |
| 162 | −1.750 | 16 | 1.750 | −1 | 11 | −0.83333 | −1.00000 |
| 161 | −1.875 | 16 | 1.750 | −1 | 11 | −0.90000 | −1.07143 |
| 160 | −2.000 | 16 | 1.750 | −1 | 11 | −0.96667 | −1.14286 |
| 157 | −2.125 | 16 | 1.750 | −1 | 11 | −1.03333 | −1.21429 |
| 156 | −2.250 | 16 | 1.750 | −1 | 11 | −1.10000 | −1.28571 |
| 155 | −2.375 | 16 | 1.750 | −1 | 11 | −1.66667 | −1.35714 |
| 154 | −2.500 | 16 | 1.750 | −1 | 11 | −1.23333 | −1.42857 |
| 153 | −2.625 | 16 | 1.750 | −1 | 11 | −1.30000 | −1.50000 |
| 152 | −2.750 | 16 | 1.750 | −12 | 33 | −1.36667 | −1.57143 |
| 151 | −2.675 | 16 | 1.750 | −12 | 33 | −1.43333 | −1.64286 |
| 150 | −3.000 | 16 | 1.750 | −2 | 00 | −1.50000 | −1.71429 |
| 147 | −3.125 | 16 | 1.750 | −2 | 00 | −1.56667 | −1.78571 |
| 146 | −3.250 | 16 | 1.750 | −2 | 00 | −1.63333 | −1.85714 |
| 145 | −3.375 | 16 | 1.750 | −2 | 00 | −1.70000 | −1.92057 |
| 144 | −3.500 | 16 | 1.750 | −2 | 00 | −1.76667 | −2.00000 |
| 143 | −3.635 | 16 | 1.750 | −2 | 00 | −1.83333 | −2.07143 |
| 142 | −3.750 | 16 | 1.750 | −2 | 00 | −1.90000 | −2.10286 |
| 141 | −3.875 | 16 | 1.750 | −2 | 00 | −1.96667 | −2.21429 |
| 140 | −4.000 | 16 | 1.750 | −2 | 00 | −2.03333 | −2.28571 |
| 137 | −4.125 | 16 | 1.750 | −2 | 00 | −2.10000 | −2.35714 |
| 136 | −4.250 | 16 | 1.750 | −2 | 00 | −2.16667 | −2.42857 |
| 135 | −4.375 | 16 | 1.750 | −2 | 00 | −2.23333 | −2.50000 |
| 134 | −4.500 | 16 | 1.750 | −2 | 00 | −2.30000 | −2.57143 |
| 133 | −4.625 | 16 | 1.750 | −2 | 00 | −2.36667 | −2.64288 |
| 132 | −4.750 | 16 | 1.750 | −2 | 00 | −2.43333 | −2.71429 |
| 131 | −4.875 | 16 | 1.750 | −2 | 00 | −2.50000 | −2.76571 |
| 130 | −5.000 | 16 | 1.750 | −2 | 00 | −2.56667 | −2.85714 |
| 127 | −5.125 | 16 | 1.750 | −2 | 00 | −2.63333 | −2.92857 |
| 0 | 0.000 | 17 | 1.875 | 0 | 01 | 0.09375 | 0.00000 |
| 177 | −0.125 | 17 | 1.875 | 0 | 01 | 0.03125 | −0.06667 |
| 176 | −0.250 | 17 | 1.875 | 0 | 01 | −0.03125 | −0.13333 |
| 175 | −0.375 | 17 | 1.875 | 0 | 01 | −0.09375 | −0.20000 |
| 174 | −0.500 | 17 | 1.875 | 0 | 01 | −0.15625 | −0.26667 |
| 173 | −0.625 | 17 | 1.875 | 0 | 01 | −0.21075 | −0.33333 |

FIG. 4L

| dividend octal | dividend decimal | divisor octal | divisor decimal | quot val | state assgn | max range −8/3 ◄------- | min range 0 |
|---|---|---|---|---|---|---|---|
| 172 | −0.750 | 17 | 1.875 | 0 | 01 | −0.28125 | −0.40000 |
| 171 | −0.875 | 17 | 1.875 | −10 | 31 | −0.34375 | −0.46667 |
| 170 | −1.000 | 17 | 1.875 | −10 | 31 | −0.40625 | −0.53333 |
| 167 | −1.125 | 17 | 1.875 | −10 | 31 | −0.46875 | −0.60000 |
| 166 | −1.250 | 17 | 1.875 | −10 | 31 | −0.53125 | −0.66667 |
| 165 | −1.375 | 17 | 1.875 | −1 | 31 | −0.54375 | −0.73333 |
| 164 | −1.500 | 17 | 1.875 | −1 | 31 | −0.65625 | −0.80000 |
| 163 | −1.625 | 17 | 1.875 | −1 | 11 | −0.71875 | −0.56667 |
| 162 | −1.250 | 17 | 1.875 | −1 | 11 | −0.78125 | −0.93333 |
| 161 | −1.875 | 17 | 1.875 | −1 | 11 | −0.04375 | −1.00000 |
| 160 | −1.200 | 17 | 1.875 | −1 | 11 | −0.90623 | −1.06667 |
| 157 | −2.125 | 17 | 1.875 | −1 | 11 | −0.96975 | −1.13333 |
| 156 | −2.250 | 17 | 1.875 | −1 | 11 | −1.03125 | −1.20000 |
| 155 | −2.375 | 17 | 1.875 | −1 | 11 | −1.09375 | −1.26667 |
| 154 | −2.500 | 17 | 1.875 | −1 | 11 | −1.15623 | −1.33333 |
| 153 | −2.625 | 17 | 1.875 | −1 | 11 | −1.23675 | −1.40000 |
| 152 | −2.750 | 17 | 1.875 | −1 | 11 | −1.20125 | −1.46667 |
| 151 | −2.875 | 17 | 1.875 | −12 | 33 | −1.34375 | −1.53333 |
| 150 | −3.000 | 17 | 1.875 | −12 | 33 | −1.40625 | −1.60000 |
| 147 | −3.125 | 17 | 1.875 | −12 | 33 | −1.46075 | −1.66667 |
| 146 | −3.250 | 17 | 1.875 | −2 | 00 | −1.53125 | −1.73333 |
| 145 | −3.375 | 17 | 1.875 | −2 | 00 | −1.59375 | −1.80000 |
| 144 | −3.500 | 17 | 1.875 | −2 | 00 | −1.65623 | −1.86667 |
| 143 | −3.625 | 17 | 1.875 | −2 | 00 | −1.71075 | −1.93333 |
| 142 | −3.750 | 17 | 1.875 | −2 | 00 | −1.78125 | −1.20000 |
| 141 | −3.875 | 17 | 1.875 | −2 | 00 | −1.84375 | −2.06667 |
| 140 | −4.000 | 17 | 1.875 | −2 | 00 | −1.90625 | −2.13333 |
| 137 | −4.125 | 17 | 1.875 | −2 | 00 | −1.96675 | −2.20000 |
| 136 | −4.250 | 17 | 1.875 | −2 | 00 | −2.03125 | −2.26667 |
| 135 | −4.375 | 17 | 1.875 | −2 | 00 | −2.09375 | −2.33333 |
| 134 | −4.500 | 17 | 1.875 | −2 | 00 | −2.15625 | −2.60000 |
| 133 | −4.625 | 17 | 1.875 | −2 | 00 | −2.21875 | −2.46667 |
| 132 | −4.750 | 17 | 1.875 | −2 | 00 | −2.28125 | −2.53333 |
| 131 | −4.075 | 17 | 1.875 | −2 | 00 | −2.34375 | −2.60000 |
| 130 | −5.000 | 17 | 1.875 | −2 | 00 | −2.40625 | −2.66667 |
| 127 | −5.125 | 17 | 1.875 | −2 | 00 | −2.46075 | −2.73333 |
| 126 | −5.375 | 17 | 1.875 | −2 | 00 | −2.59375 | −2.86667 |
| 125 | −5.375 | 17 | 1.875 | −2 | 00 | −2.59375 | −2.86667 |
| 124 | −5.500 | 17 | 1.875 | −2 | 00 | −2.65625 | −2.93333 |

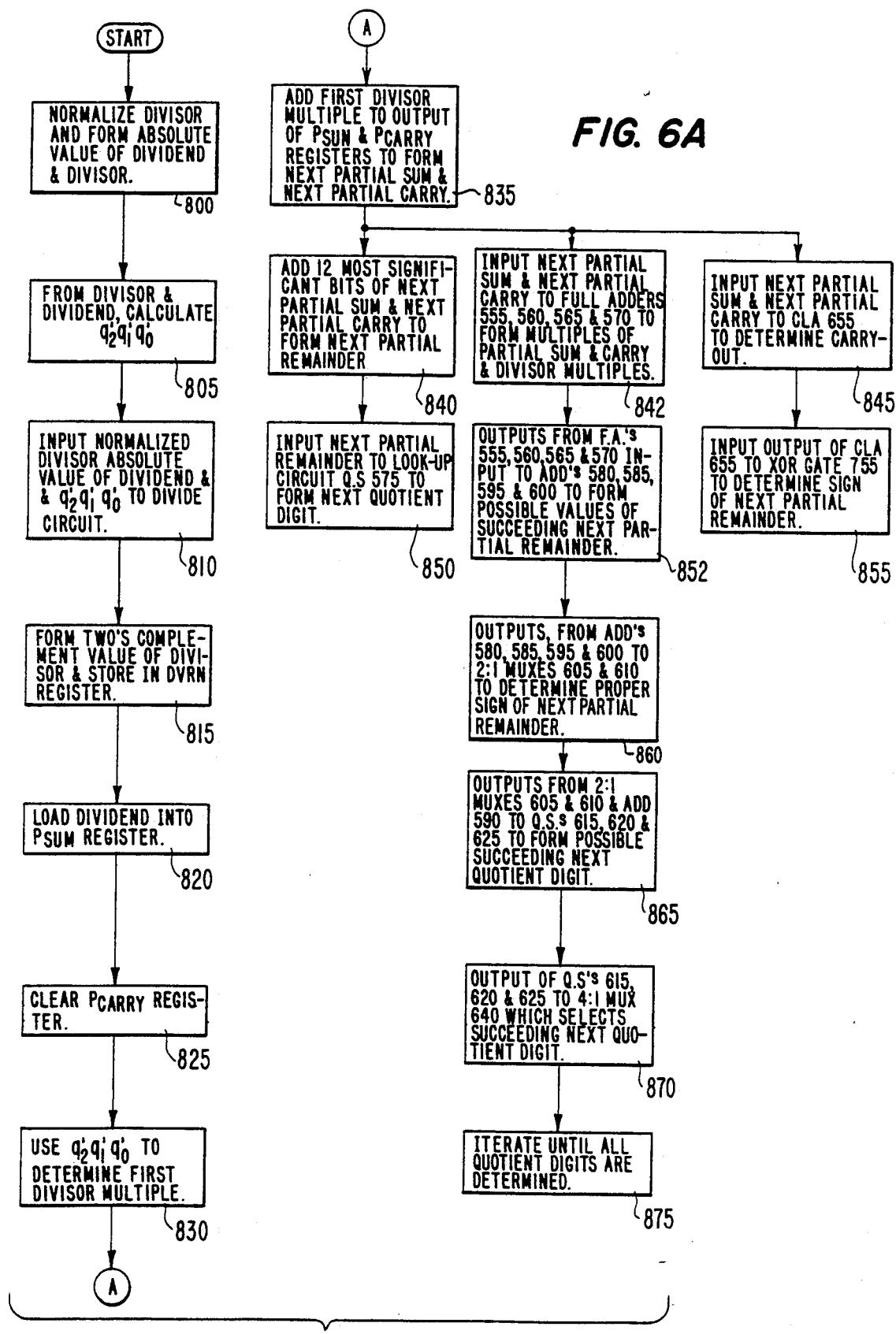

DIVISION METHOD AND APPARATUS INCLUDING USE OF A Z—Z PLOT TO SELECT ACCEPTABLE QUOTIENT BITS

BACKGROUND OF THE INVENTION

The present invention relates to an optimized division circuit and method for implementing the optimized division circuit.

Digital division as implemented in a computer consists of a series of preliminary operations, e.g., normalization of the values for the dividend and divisor into binary normalized positive fractional form and an iterative division process, and a terminal operation, e.g., changing the form of the remainder. The iterative division process is defined by the following equation:

$$p_{j+1} = rp_j - q_{j+1}d, \quad (1)$$

where:
j = the iterative index = 0, 1, ..., m−1;
$p_j$ = the partial remainder used in the jth cycle;
$rp_j$ = the jth radix-modified remainder;
r = the radix;
$p_0$ = the dividend;
$p_m$ = the remainder;
$q_j$ = the jth quotient digit in which the quotient is of the form $q_0, q_1, q_2, \ldots, q_m$ where m = the number of digits (using radix r) in the quotient;
d = the divisor; and
$q_{j+1}d$ = the jth divisor multiple.

The basic approach is to begin with an initial guess for a quotient which is known to be within some boundaries, and then to improve upon this guess at each iteration. A nonrestoring algorithm technique can be used to select a quotient value. This algorithm allows an inexact quotient value to be selected and later corrected in the next iteration.

There are four distinct operations required per division iteration. The process consists of forming the correct divisor multiple ($q_{j+1}d$), forming the proper radix modified remainder ($rp_j$), subtracting the divisor multiple from the modified remainder and choosing the next quotient digit.

Assuming a radix equal to 4, the modified remainder can be formed by a two bit left shift of the present partial remainder. This operation is required to align the values for proper subtraction. Shifting the present partial remainder to the left is preferred over shifting the divisor multiple to the right to save hardware. Shifting the present partial remainder allows the dividend register to remain only as wide as the original dividend and not be extended to the length of the original dividend plus the width of the final quotient as right shifting the divisor multiple would. This left-shift alignment is very fast because it is done for every two bits. In radix 4 division every two quotient bits equals one radix 4 quotient digit, and one radix 4 quotient digit is determined per iteration.

The divisor multiple formation consists of multiplying the divisor by the selected quotient digit. The speed of this step depends on the range of the quotient values which may be chosen for the selected quotient digit term. Quotient digits have the values 0, 1, 2, ..., r−1. A radix 4 nonrestoring division therefore requires that multiples of 1, 2, and 3 times the divisor be available for subtraction from the present partial remainder. Divisor multiple values representing x1, x2, x0 multiplications, may be formed easily by shifting (x2), latching (x1) or clearing (x0). Divisor multiples representing x3 multiplications, however, take more time and require extra hardware because they require a tripler circuit or the addition of 1x and 2x divisor values, and the term must then be stored in an auxiliary register. To minimize the time for the critical path through the division process, it is important to limit the range of available quotient digits to quotient digits which may be formed by simple shifts and the complements of those digits. For radix 4 these digits would be −2, −1, 0, 1 and 2.

The need to restrict the range of possible quotient digits can be applied as follows: at least r unique digits are required to represent a number in radix r. In the representation introduced above, there are 2n+1 unique digits, where n represents the highest quotient digit value. Thus, $2n+1 \geq r$. On the other hand, for a radix r, the maximum value for a quotient digit n should not be greater than the value of the maximum digit representable, thus $n \leq r-1$.

Using positive and negative values for the quotient digits introduces redundancy into the representation of the quotient.

If 2n (where n is the highest quotient digit value or, in the example, 2) is greater than r−1 (r is the radix), then there are more symbols available to represent a number than is actually necessary. Therefore, some numerical values may be represented in more than one form. For example, for a radix of 4, the number 6 could be represented as 12 (i.e., 4+2) or 2(−2) (i.e., 8−2). This redundancy permits less precision in comparing the divisor and partial remainder in selecting a quotient digit, thereby enhancing the speed of the division process.

With the quotient representation now defined, the range restrictions on the partial remainders may be derived. When determining whether a quotient digit is correct or not, one is essentially applying the restriction for positive partial remainders that $0 \leq p_{j+1} < d$, where $p_{j+1}$ is the difference between the j+1 th divisor multiple ($q_{j+1}$ times the divisor) and the jth partial remainder. If $p_{j+1}$ is not within this range, then $q_{j+1}$ is changed until it is. For a nonrestoring division, negative partial remainders and negative quotient digits are allowable, and thus the range restriction is $$|p_{j+1}| \leq |d| \quad (2)$$

One prior method to implement the iterative division relationship defined in Equation (1) was described by George S. Taylor in "Compatible Hardware For Division and Square Root," Fifth IEEE Symposium on Computer Arithmetic (May, 1981). Taylor proposed the use of a graphical representation of the division procedure to select the next quotient digit in order to form the divisor multiple. The basis for the plot is the iterative relationship defined by equation (1), together with the range restriction calculated above in equation (2) which yields:

$$|p_{j+1}| \leq (n/r-1)d. \quad (3)$$

FIG. 1 illustrates the plot defined by Taylor which is essentially a plot of partial remainder (P) versus divisor (D) values and has been referred to as a "P-D plot."

Solving the recursive relationship in equation (1) for $rp_j$ yields:

$$rp_j = p_{j+1} + q_{j+1}d, \quad (4)$$

For a fixed quotient digit, the upper limit of $rp_j$ as a function of the divisor d occurs when $p_{j+1}$ is maximum, i.e., when:

$$p_{j+1} = (n/r - 1)d,$$

and thus $$rp_{jmax} = ((n/r - 1) + q_{j+1})d. \quad (5)$$

Likewise the lower limit occurs when:

$$p_{j+1} = (-n/r - 1)d,$$

and thus:

$$rp_{jmin} = ((-n/r - 1) + q_{j+1})d. \quad (6)$$

These linear equations may be plotted as functions of d with $q_{j+1}$ as a parameter ranging from $-n$ to $+n$ in steps of 1. The area between $rp_{jmax}$ and $rp_{jmin}$ for a given $q_{j+1} = i$ will be denoted as the "q(i) area."

The division procedure was then defined such that a given value of divisor d and the jth shifted partial remainder will specify a point in a q(i) area. The digit i was defined as the value of the next quotient digit $q_{j+1}$ which in turn is used in forming the next partial remainder. In this representation, the redundancy in the quotient digit selection is manifested as overlapping of the q(i) regions, i.e., some pairs of d and $rp_j$ will specify a point for which either $q_{j+1} = i$ or $q_{j+1} = i-1$ is a valid choice.

FIG. 1 is an example of a P-D plot for a division with r=4 and n=2. The region for which $q_{j+1} = 2$ is a valid choice, i.e., the q(2) area, lies between lines 2' and 2; the q(1) area lies between lines 1' and 1, and so forth. Note that in the overlap between q(i) areas, for example, the region between lines 1' and 2, either choice $q_{j+1} = 1$ or $q_{j+1} = 2$ is correct. Note further that the figure is symmetric about both axes.

On the right half of FIG. 1, "steps" have been drawn within the overlap of the q(i) regions. The width of a "step" (constant $rp_j$, d varying) defines a "divisor interval," the value of $rp_j$ for each step defines a comparison constant, and the distance between comparison constants defines a "partial remainder interval." Phrased in this terminology, division consists of locating a given divisor value within the appropriate divisor interval (using comparison constants), and selecting a value of $q_{j+1}$ enclosed by the intersection of the boundaries of these intervals. Since a divisor and partial remainder must be located only to within an "interval," they need not be inspected to full precision in selecting a correct quotient digit.

The length of a divisor interval is limited by the boundaries of the overlap region. The maximum precision of inspection is required where the divisor interval is minimum. To determine where this minimum interval occurs, consider for a given value of $rp_j$, the maximum width of a divisor interval is:

$$\Delta d = d_2 - d_1 = \frac{rp_j}{\frac{-n}{r-1} + i} - \frac{rp_j}{\frac{n}{r-1} + i - 1} \quad (7)$$

$$= rp_j R \frac{2n - R}{R^2 i^2 - R^2 i + nR - n^2}$$

where $R = (r-1)$.

The interval $\Delta d$ is minimum when i is maximum and $rp_j$ is minimum. The maximum value of i is n; the minimum of $rp_j$ for $q_{j+1} = n$ will occur when the upper bound of the overlap region intersects $d = \frac{1}{2}$, i.e., when $d_1 = \frac{1}{2}$. The precision of required inspection is thus determined by the divisor interval closest to $d = \frac{1}{2}$ and between $q_{j+1} = n$ and $q_{j+1} = n-1$.

Taylor's technique uses the P-D plot to decode the divisor interval and partial remainder interval, and to select the quotient digit indicated by their intersection. He also proposed generating a look-up table based on the plot. This look-up table was then used to form logical equations to define and implement a division circuit.

This method has several disadvantages, however. First, the P-D plot must be constructed manually and there is a certain amount of imprecision in the defined boundaries of the plot which therefore introduces some imprecision into the selection of a quotient. Second, Taylor's table is incomplete because the method is not precise in its inspections of combinations of divisors and partial remainders. The circuit for performing the division operation is thus implemented by inspection of the incomplete look-up table and has proven to be difficult to construct requiring a large number of stages of logical gates thus reducing the speed of the division operation.

SUMMARY OF THE INVENTION

It is, accordingly, an object of the present invention to provide an optimized division circuit and a method for implementing the optimized division circuit which decreases the amount of hardware required to implement the circuit and in which the method of implementing the circuit may be more easily and efficiently realized.

Additional objects and advantages of the invention will be set forth in part in the description which follows, and in part will be obvious from the description or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, this invention, in one aspect, includes a method for implementing an optimized division circuit having as inputs a divisor and a dividend and producing as an output a quotient composed of a succession of quotient digits chosen from a set of acceptable digits determined according to a given radix, each successive digit of the quotient being formed by examining a succession of partial remainder values and the divisor wherein a next partial remainder value is equal to the difference between a most recently determined partial remainder value and a most recently determined divisor multiple value, and wherein the most recently determined divisor multiple value is equal to the product of the most recently formed quotient digit and the divisor, a first value for the most recently determined partial remainder value being the dividend. The method comprises the steps of determining a Z—Z plot relationship for the set of acceptable quotient digits; automatically building a complete table of next quotient digits from the Z—Z plot relationship including, for each different valid combination of divisor and next partial remainder values, either a corresponding one of the acceptable quotient digits or a DON'T CARE indicator for the ones of the combinations having more than one corresponding quotient digit; and assigning a different state value to each different quotient digit, the state values to be used in the implementation of the optimized division circuit. The Z—Z plot represents for each of the set of acceptable digits for the quotient, a relationship between a first divisor ratio and a second divisor ratio, the first divisor ratio being proportional to a range of most recently determined partial remainder values divided by the divisor, and the second divisor ratio being equal to a range of next partial remainder values divided by the divisor.

This invention, in another aspect, includes an optimized division circuit receiving as inputs a divisor in binary normalized positive fractional format and a dividend in positive two's complement format and produces as an output a quotient also in positive two's complement format, the quotient being composed of a succession of quotient digits chosen from a set of acceptable digits determined according to a given radix. The circuit comprises divisor multiple formation means, receiving as inputs the divisor and a most recently determined one of the quotient digits, for calculating successive divisor multiples as products of the divisor and of successive ones of the determined quotient digits; and quotient determining means, coupled to receive the dividend and the successive divisor multiples, for producing the succession of quotient digits. The divisor multiple formation means includes a divisor multiple multiplexer having selection terminals connected to receive the most recently determined quotient digit and input terminals connected to receive input signals representing various multiples of the divisor. The quotient determining means includes next partial remainder determining means, receiving as inputs the most recently determined divisor multiple and a most recently determined next partial remainder value or, if no next partial remainder value has yet been determined, the dividend, and for producing the next partial remainder as an output; and next quotient digit selection means, receiving as inputs at least a portion of the divisor and the next partial remainder, for selecting the next one of the quotient digits according to a predetermined relationship.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIGS. 3A-3D contain a flow diagram illustrating a method for implementing an optimized division circuit in accordance with a preferred embodiment of the present invention;

FIGS. 4A-4L are table of quotient values for partial remainder/divisor combinations;

FIGS. 6A-6B contain a flow diagram illustrating the operation of the division circuit of FIGS. 5A-5D.

DETAILED DESCRIPTION OF THE PREFERRED EMBODIMENT

Figure 1:
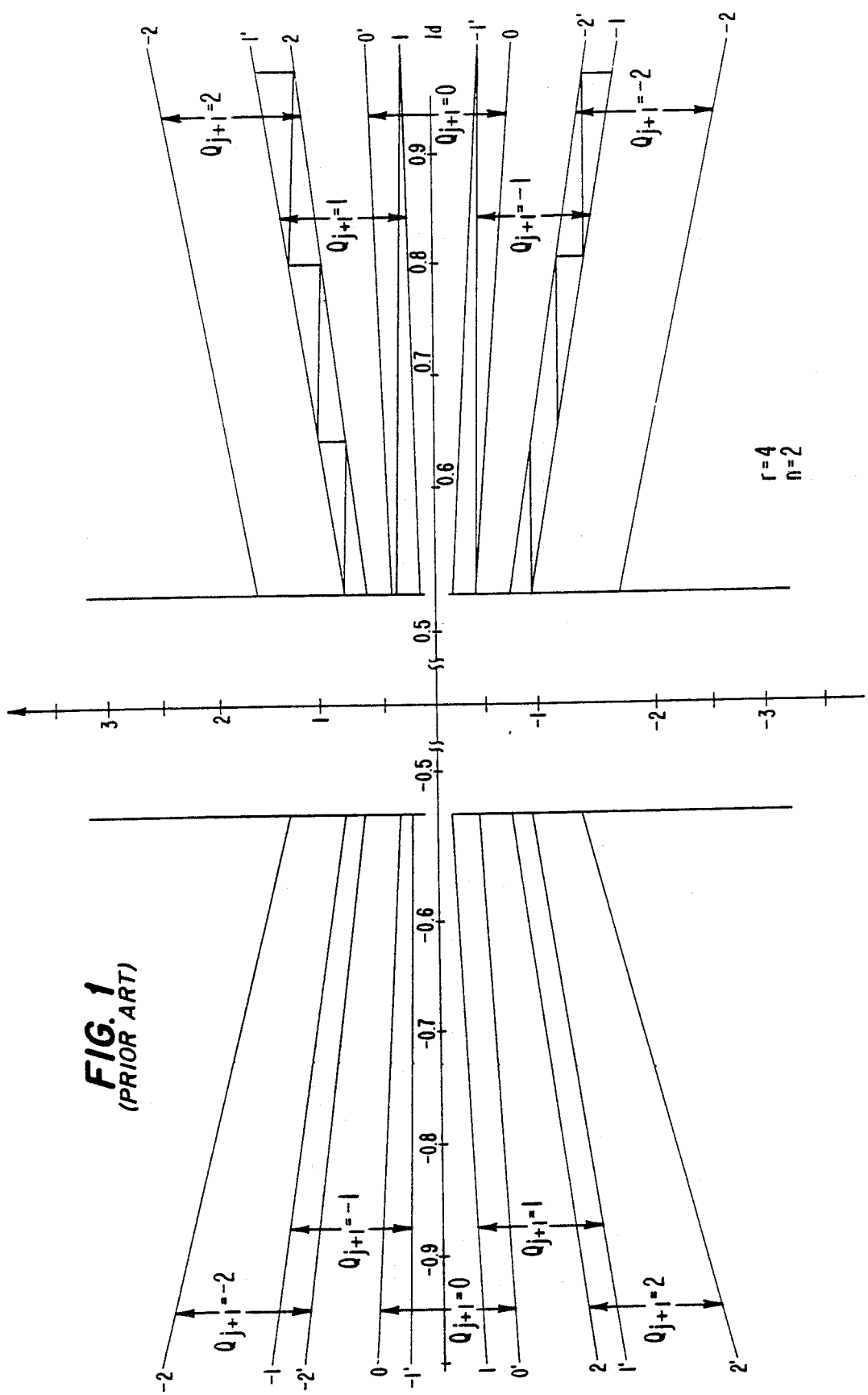
FIG. 1 is a graphical representation of a present remainder-divisor (P-D) plot for determining values of a next quotient digit to be selected.

Reference will now be made in detail to the present preferred embodiment of the invention, an example of which is illustrated in the accompanying drawings in which like reference characters refer to corresponding elements.

A. Z—Z Plot

The division circuit of the present invention is implemented from a logical reduction performed on logical equations derived from a complete look-up table. Through use of a complete look-up table, a greater amount of logical reduction can be achieved resulting in fewer gates and stages needed for the implementation of the division circuit. Therefore, a faster division operation can be achieved.

The division circuit has as inputs a divisor and a dividend and produces as an output a quotient composed of a succession of quotient digits. The quotient digits are chosen from a set of acceptable digits determined according to a given radix, as described above. Each successive digit of the quotient is formed by examining a succession of partial remainder values and the divisor. The next partial remainder value is equal to the difference between a most recently determined partial remainder value and a most recently determined divisor multiple value. The most recently determined divisor multiple value is equal to the product of the most recently formed quotient digit and the divisor. The first value for the most recently determined partial remainder value is the dividend.

Fundamental to an understanding of this invention is the understanding of a Z—Z plot, which is different from the P-D plot in FIG. 1. The Z—Z plot was described by Daniel E. Atkins in "Higher-Radix Division Using Estimates of the Divisor and Partial Remainders" *IEEE Transactions on Computers*, Vol. C-17, No. 10 (Oct. 1968). The Z—Z plot is a graph of quotient digits based upon values of the next partial remainder, the most recently determined partial remainder, the divisor, and the radix. The advantages of using a Z—Z plot will become more apparent from a description of the invention. The derivation of the Z—Z plot is set forth below.

Equation (1) can be normalized with respect to the divisor and rewritten, letting $z_j = p_j/d$ and $z_{j+1} = p_{j+1}/d$:

$$z_{j+1} = rz_j - q_{j+1} \qquad (8)$$

Equation (8) may be interpreted graphically as a plot of $z_{j+1}$ versus $rz_j$ with the quotient digit $q_{j+1}$ as a parameter. Such a representation is called a "Z—Z plot" and is shown in FIG. 2A.

Figure 2A:
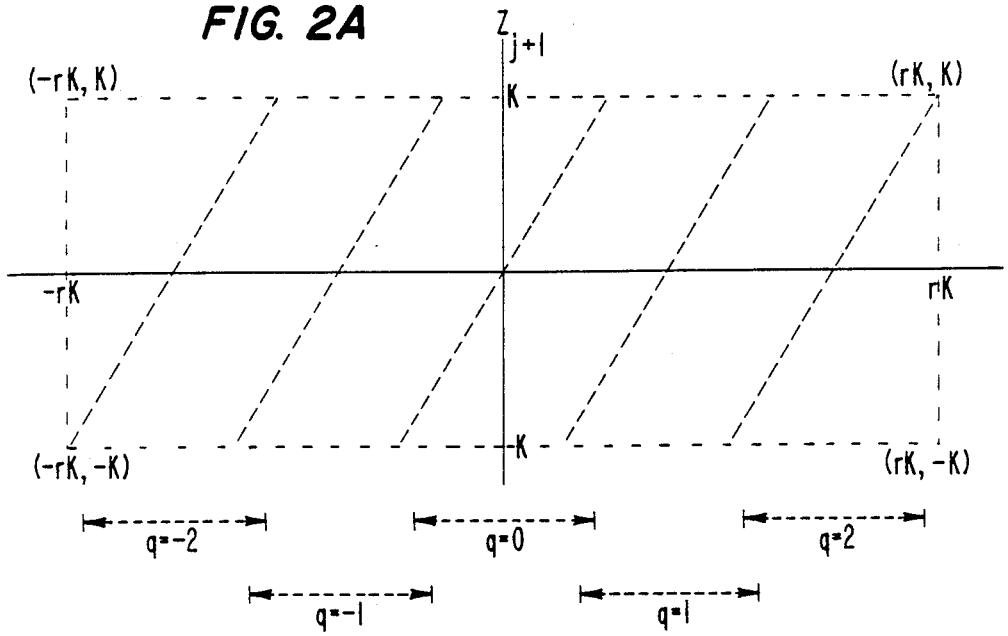
FIGS. 2A-2B are graphical representations of Z—Z plots representing the relationship between (the present remainder÷the divisor) and (the next remainder÷the divisor) for each of a set of acceptable quotient digits.

In the Z—Z plot shown in FIG. 2A, each line which corresponds to a different quotient digit is called a "q line." It is necessary to bound the plot so that for any value of $z_j$ there exists at most 2 quotient digits which may be selected. The bounds chosen are based on the range which the value of $z_j$ may vary. A constant k is chosen to represent the bounds. The value for k is based on the radix. The bounds are chosen such that for each value of $rz_j$ in the allowed range there must correspond a quotient digit and a value of $z_{j+1}$, also in the allowed range. In terms of FIG. 2A, this means that for any point on the $rz_j$ axis such that $-rk \leq rz_j \leq rk$, one must be able to move on a line segment normal to the $rz_j$ axis and intersect a q-line at a point corresponding to a $z_{j+1}$ within the range $-k \leq z_{j+1} \leq k$. This allowed range is enclosed between the lines $z_{j+1}=k$ and $z_{j+1}=-k$, as shown in FIG. 2A.

In order to solve for k when defining the bounds of the Z—Z plot, consider the following. Even though the division operation may be with a radix greater than 2, the divisor will be represented as a binary number for the logic implementation, and should be represented in binary normalized form, i.e., restricted to the range $\frac{1}{2} \leq d \leq 1$ or $0.1_2 \leq d \leq 1_2$. If d is within this range, the lower limit of k is $\frac{1}{2}$, or $0.1_2$ to maintain the normalized form. In nonrestoring radix 2 division, $|p_{j+1}| \leq d$ (see Equation (2) above). In computing a Z—Z plot, however, the restriction is $$|p_{j+1}| \leq k|d|,$$  Equation (9)

where k is based on the radix used. The upper limit on k is obviously 1 since if $k=1$, then you are performing nonrestoring radix 2 division. To satisfy the above requirements, that is, $-rk \leq rz_j \leq rk$ and $-k \leq z_{j+1} \leq k$, value of $rz_j$, i.e., rk, must occur at the intersection of $z_{j+1}=k$ and the q line, $z_{j+1}=rz_j-n$, as described above, where n is the highest quotient digit value. Similarly, the minimum value must occur at the intersection of $z_{j+1}=-k$, and the q line, $z_{j+1}=-rz_j+n$. These bounds on $rz_j$ are indicated by the dashed vertical lines of FIG. 2A. When the two equations $z_{j+1}=rz_j-n$ and $z_{j+1}=k$ are solved simultaneously for $n=2$:

$$z_{j+1} = k$$
$$z_{j+1} = rz_j - 2$$
$$k = rz_j - 2 \ldots \text{but: } rz_j = rk$$
(so substituting $rk$ for $rz_j$ in lefthand equation)
$$k = rk - 2 \ldots \text{and } r = 4$$
(so substituting 4 for r in righthand equation)
$$k = 4k - 2$$

Figure 2B:
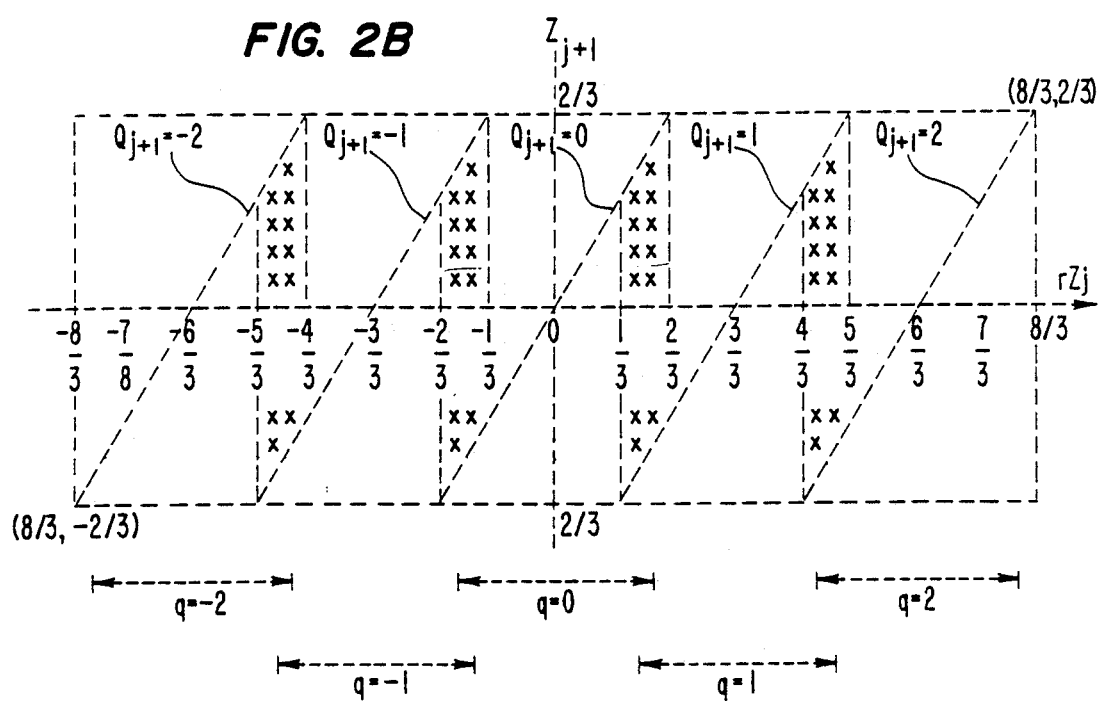

Therefore, $k=\frac{2}{3}$. The bounds of the Z—Z plot are shown in FIG. 2B. The horizontal bounds of the Z—Z plot are from $-8/3$ to $+8/3$, and the vertical bounds are from $-\frac{2}{3}$ to $+\frac{2}{3}$.

In accordance with the present invention, the method for implementing an optimized division circuit includes the step of determining a Z—Z plot relationship for the set of acceptable quotient digits representing, for each of the set of acceptable digits for the quotient, a relationship between a first divisor ratio and a second divisor ratio. The first divisor ratio is proportional to a range of most recently determined partial remainder values divided by the divisor (i.e., $rz_j$); and the second divisor ratio is equal to a range of next partial remainder values divided by the divisor (i.e., $z_{j+1}$).

The Z—Z plot may be used to determine minimum and maximum values for a first divisor ratio which is proportional to a range of values for $rz_j$ or $rp_j/d$. Those minimum and maximum values correspond to positive and negative values of the most recently determined partial remainder values. Once these values are determined, if they are within $\frac{2}{3}$ units of the same integer, this integer is the next quotient digit. If they both lie within an overlap region, then the next quotient digit may be chosen from either q line quotient digit. For example, if ($rp_j/d$ or $rz_j$) is greater than zero and less than $\frac{1}{3}$, then the next quotient digit to be selected is $q=0$ because the q-line of $q_{j+1}=0$ is the closest line within that range where ($rp_j/d$) is greater than zero and less than $\frac{1}{3}$. Similarly, if ($rp_j/d$) is greater than $\frac{1}{3}$ and less than $5/3$, the next quotient digit to be selected is $q=1$.

In accordance with the present invention, the method for implementing the optimized division circuit includes the step of automatically building a complete table of next quotient digits from the Z—Z plot relationship including, for each different combination of valid divisor and next partial remainder values, either a corresponding one of the acceptable quotient digits or a DON'T CARE indicator for the ones of the combinations having more than one corresponding quotient digit. As embodied herein, a quotient selection program automatically determines the next quotient digit in the range defined by the divisor and next partial remainder based on the Z—Z plot relationship and then outputs a complete look-up table to specify the next quotient digit to be selected within a defined range.

B. State Table Generation

Figure 3A:
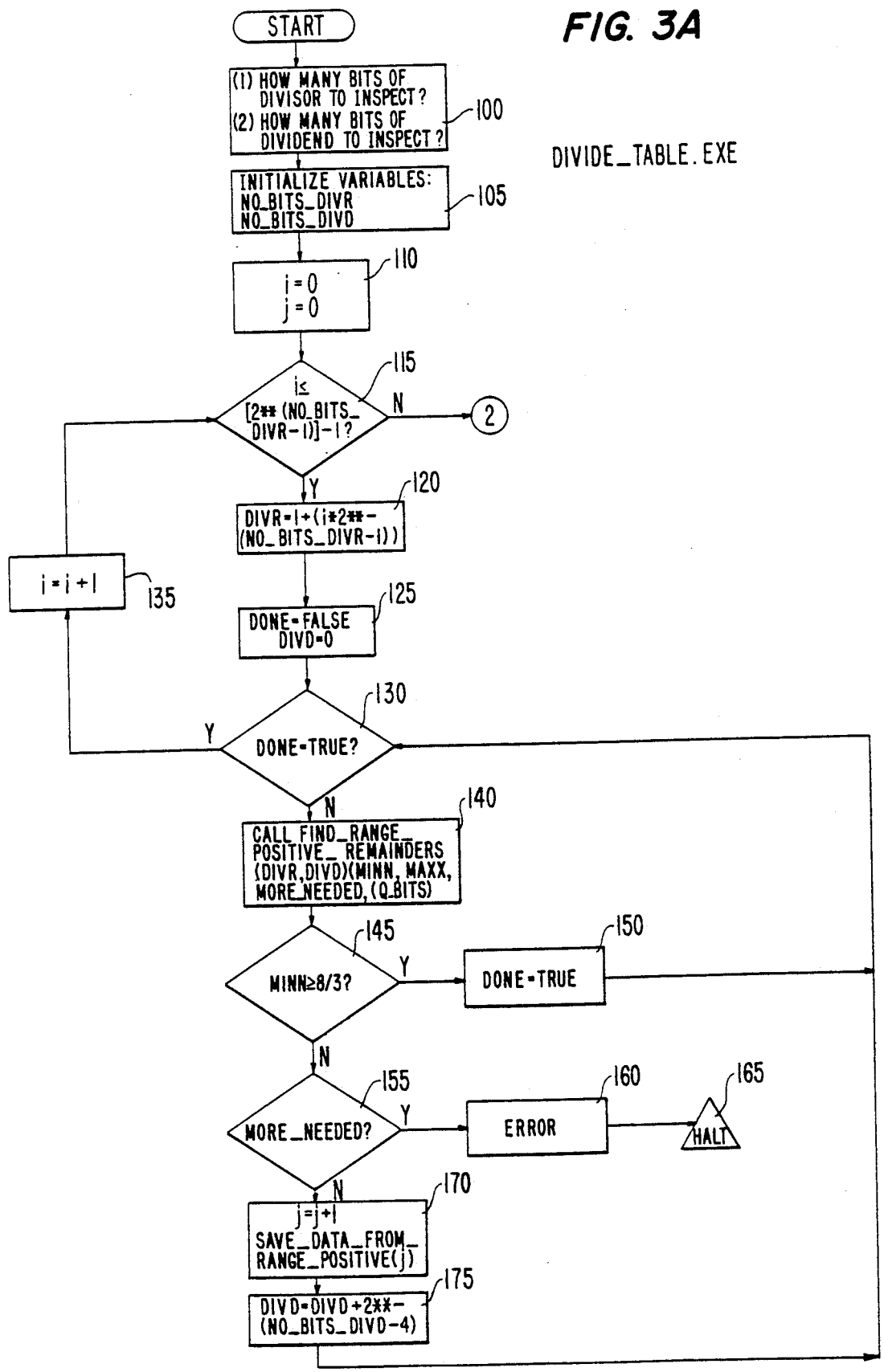
Figure 3B:
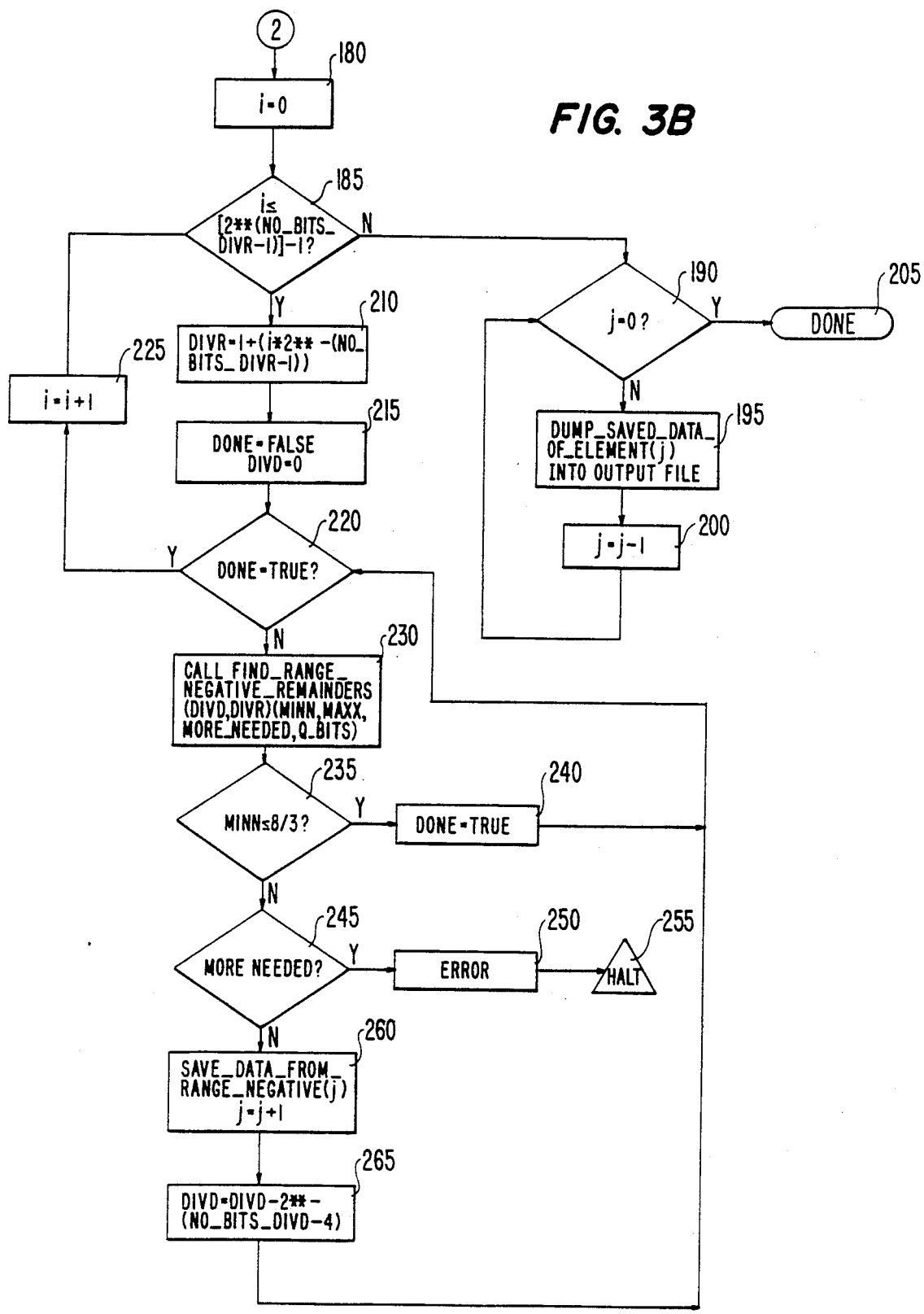

FIGS. 3A through 3D contain a flow diagram of a quotient selection program which is designed to produce a complete look-up table in accordance with the invention. FIGS. 3A and 3B illustrate the main routine of the quotient selection program entitled DIVIDE_TABLE.EXE and FIGS. 3C and 3D contain flow diagrams of the FIND_RANGE_POSITIVE_REMAINDER and FIND_RANGE_NEGATIVE_REMAINDER subroutines, respectively.

In FIG. 3A, certain initialization procedures are performed. These procedures include determining the number of divisor and dividend (partial remainder) combinations to inspect in generating the look-up table (step 100) and initializing the variables NO_BITS_DIVR and NO_BITS_DIVD, which represent "number of bits of divisor" and "number of bits of dividend," respectively (step 105). Truncated values of the most recently determined partial remainder and divisor may be used to implement a look-up table and, in the preferred embodiment, the seven most significant bits of the dividend or the most recently determined partial remainder value and the four most significant bits of the divisor are used. Actually, if the divisor is in binary normalized positive format, there is always a "1" immediately to the left of the radix point, so only three bits of the divisor need to be inspected. Since we are using truncated values of the divisor and dividend, NO_BITS_DIVR=4 and NO_BITS_DIVD=7. The counters i and j for the program's loops are also initially set to 0 (step 110).

The main loop of the program begins at step 115 which examines divisor counter i. The divisor counter indicates the number of times the program will pass through the main loop. The formula at step 115 sets the upper bound at 2 raised to a power of NO_BITS_DIVR—1, so the upper bound is really the number of possible divisor values. In our example, NO_BITS_DIVR is 4 due to truncation, so the number of times this loop will be run is 8 times ($2^{4-1}=8$).

The loop continues at step 120 where the value for the divisor is calculated to be equal to $1+(i \times 2^{**}-(\text{NO\_BITS\_DIVR}-1))$. The first "1" reflects the normalization of the divisor value and the binary fraction is used to shift i to the proper position in the normalized divisor.

At step 125, the variable DONE is set equal to FALSE and the variable DIVD is set equal to 0. This is to allow all possible values for the dividend to be calculated with the divisor determined at step 120. The divisor-calculating loop is the outer loop and the dividend-calculating loop is the inner loop. Therefore, all possible values of the partial remainder (from $-8/3$ to $+8/3$) are calculated for a given valid divisor value (from 1.000 to 1.111). At step 130, a determination is made as to whether all values for the dividend have been calculated (i.e., DONE=TRUE). If so, the program goes to step 135 which increments the divisor counter. If not, the program proceeds to step 140 which calls the subroutine FIND_RANGE_POSITIVE_REMAINER.

Figure 3C:
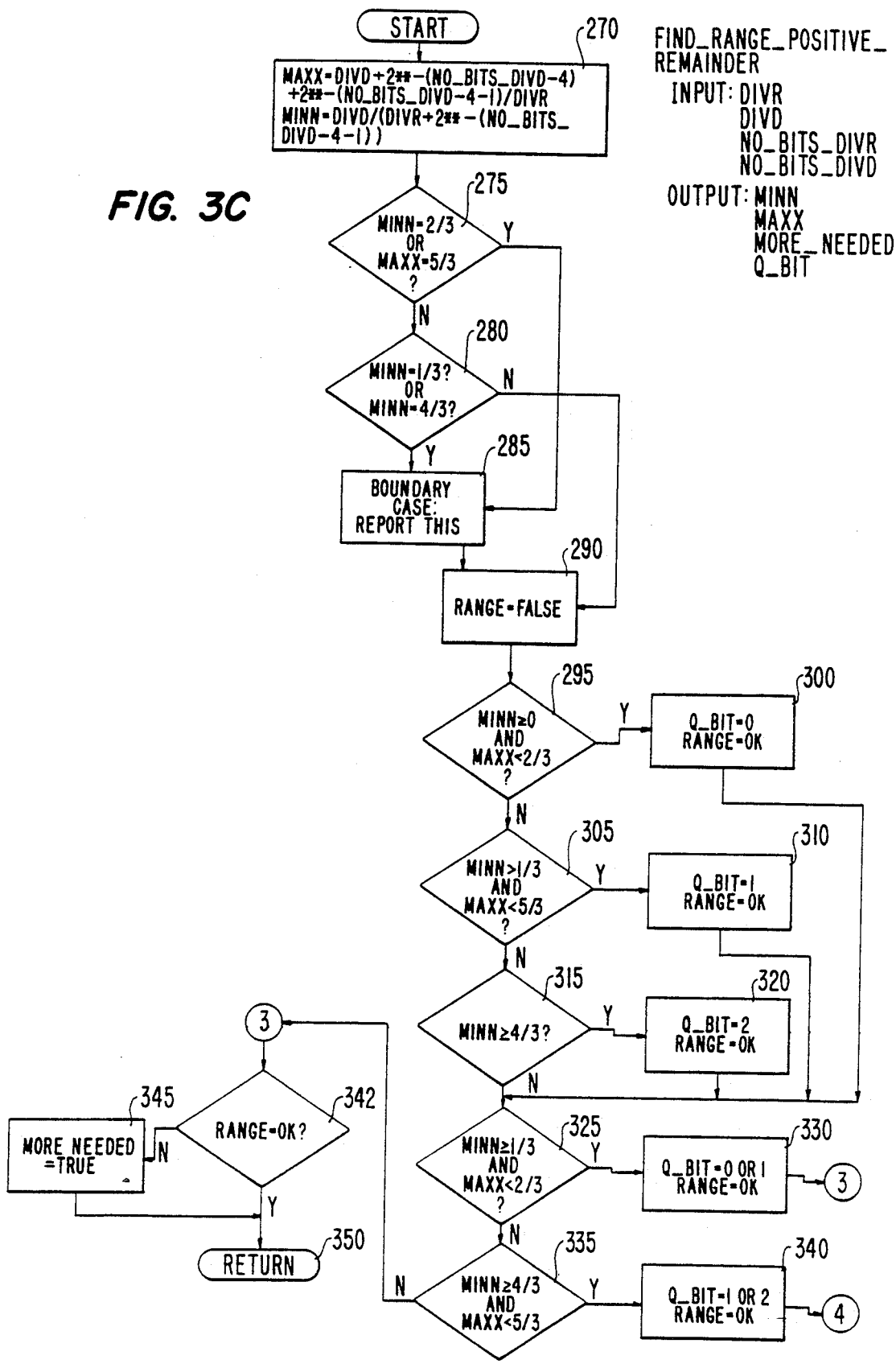

FIG. 3C contains a flow diagram of the FIND_RANGE_POSITIVE_REMAINDER subroutine which was called at block 140. Essentially this subroutine automatically determines the next quotient digit when the most recently determined partial remainder is positive based on the Z—Z plot relationship discussed above.

First, the maximum and minimum values of the (most recently determined partial remainder÷divisor, or $z_j$ on the Z—Z plot) are determined by the following formulas: $MAXX=DIVD+[2^{}-(NO\_BITS\_DIVD-4)]+[2^{}-(NO\_BITS\_DIVD-4-1)[/DIVR;$  $MINN=DIVD/(DIVR+[2^{}-(NO\_BITS\_DIVR-1)])$ step 270). These formulas take into account the fact that only the four most significant bits of the divisor and the seven most significant bits of the dividend are considered. For example, the term $(2^{}-(NO\_BITS\_DIVD-4)$, or $2^{-3})$, in the numerator of MAXX is a correction factor for the maximum error which could occur due to truncation in the look-up table, assuming that all of the bits dropped in the truncation were 1's. Recall that the form of the partial remainder is $X_4X_3X_2X_1 \cdot Y_1Y_2Y_3$ or in binary: $2^3 2^2 2^1 2^0 \cdot 2^{-1} 2^{-2} 2^{-3}$. So, $Y_3$ is weighted with $2^{-3}$. The bits dropped in the truncation are: $2^{-4}+2^{-5}+2^{-6}+\ldots+2^{-n}$ which equals $2^{-3}-2^{-n}$. In the preferred embodiment $n=56$ and since $2^{-56}$ is very small compared to $2^{-3}$, the $(-2^{-n})$ factor can be dropped, thus leaving the correction factor of $2^{-3}$.

The term $(2^{**}-(NO\_BITS\_DIVR)$ or $2^{-4})$ in the last component of the numerator of MAXX is a correction factor for the maximum error which could occur due to the truncated value of the present partial remainder. It is divided by DIVR because MAXX is a value related to $z_j$, or most recently determined partial remainder÷divisor.

The term $(2^{**}-(NO\_BITS\_DIVD-4-1)$, or $2^{-4})$, added to DIVR in the denominator of MINN is a correction factor for the maximum error which could occur due to the form of representation. There is imprecision which could occur due to an incomplete two's complement operation. In the preferred embodiment, the carry is not completed because only a partial sum and a partial carry vector are added. Therefore, it is conceivable that a carry could ripple into the least significant bit of a partial sum vector from a previously computed partial remainder vector.

The maximum $z_j$ will occur when the most recently determined partial remainder (or dividend for the first iteration) is at a maximum and the divisor is at a minimum, and the minimum $z_j$ will occur when the most recently determined partial remainder is at a minimum and the divisor is at a maximum.

Then, at step 275, a determination is made whether MAXX is equal to ⅔ or 5/3. These numbers represent areas where q-lines overlap on the Z—Z plot and the program was written so that it will flag when these situations occur because the computer does not represent X/3 well. If so, the value for the final quotient will be a boundary case, i.e., one of the boundaries of the Z—Z plot, and the program will report this at step 285. If MAXX is not equal to ⅔ or 5/3, the program continues at step 280 where a determination is made whether MINN is equal to ⅓ or 4/3. If so, this is also boundary case, and the program will report this at step 285.

In either of the cases, the program continues at step 290 where the value for the range of possible values for $z_j$ is set equal to FALSE. If RANGE is not set to TRUE, then there are not enough bits for DIVR or DIVD. This is an analytical check to determine whether the number of inspected bits initially set was correct.

The program then continues at step 295 where a determination is made whether MINN is greater than or equal to 0 and whether MAXX is less than ⅔. If so, at step 300, the value for the next quotient digit is set equal to 0 and the minimum and maximum values and resultant range are OK because there does exist a corresponding quotient digit within the defined range. In other words, the precision of the inspection of the divisor and dividend bits was great enough to be able to accurately determine a value for MINN and MAXX such that there exists a q line on the Z—Z plot within the minimum and maximum range of $z_j$ on the Z—Z plot.

If MINN was not greater than or equal to 0 or MAXX was not less than ⅔, the program continues at step 305 where a determination is made whether the value for MINN is greater than ⅓ and whether the value for MAXX is less than 5/3. If so, the value for the next quotient digit is set to 1 at step 310 and the minimum, maximum and range values are OK. If not, the program continues at step 315.

At step 315, a determination is made whether the value for MINN is greater than or equal to 4/3. If so, the value for the next quotient digit is set to 2 at step 320, and the minimum, maximum and range values are OK. If the value for MINN is not greater than or equal to 4/3, the program continues at step 325. Step 325 is also the destination after each of steps 300, 310 and 320 when the next quotient digit is determined.

At step 325, a determination is made whether the value for MINN is greater than or equal to ⅓ and whether the value for MAXX is less than ⅔. If so, at step 330, the value for the next quotient digit is set equal to 0 or 1, meaning that either quotient digit may be selected, and the program determines that the minimum, maximum and range values are OK. Otherwise, the program continues at step 335.

At step 335, a determination is made whether the value for MINN is greater than or equal to 4/3 and whether the value for MAXX is less than 5/3. If so, at step 340, the value for the next quotient digit is set equal to 1 or 2 and the program determines that the minimum, maximum and range values are OK. The routine then branches to step 342.

If the determination at step 335 was negative, the program branches to step 342 where, if the value of RANGE is not equal to OK, it is determined that more bits are needed to be inspected at step 345. Then the subroutine returns to the main program since this error has occurred.

At step 145, a determination is made whether the minimum value of the most recently determined remainder÷divisor is greater than or equal to 8/3. If so, at step 150, DONE is set equal to TRUE because the maximum value for $rz_j$ on the Z—Z plot for radix=4 is 8/3, and the program loops back to step 130 because all allowable dividend values have been tested. If not, at step 155, a determination is made whether more bits of the divisor or dividend should be inspected. This occurs if, in the FIND_RANGE_POSITIVE_REMAINDER algorithm, insufficient accuracy was available to choose quotient digits.

If more bits of the divisor need to be inspected, the program goes to step 160 which recognizes that an error has occurred and halts the program at step 165. If more bits of the divisor are not needed, the program continues to step 170 where the value for j, the dividend counter, is incremented and the data calculated by the FIND_RANGE_POSITIVE_REMAINDER subroutine is saved to be output to a table at a later stage.

The main program then continues at step 175 where the value for the next partial remainder is incremented using the formula $DIVD=DIVD+2^{}-(NO\_BITS\_DIVD-4)$. The "4" takes into account the number of bits in front of the radix point for the truncated value of the dividend or partial remainder. The program then loops back to step 130 for a determination whether DONE has been set equal to TRUE. If so, the value for i is incremented at step 135, and the program moves back to step 115** to calculate all possible values for the partial remainder with the new value of the divisor.

If, in step 115, it has been determined that all the divisor values have been calculated, the program proceeds to step 180. At step 180, the program begins computing the values for the negative partial remainders and the value for the divisor counter i is set equal to 0. At step 185, the value for i is again compared to the upper bound of one less than 2 raised to the power $NO\_BITS\_DIVR-1$. As with step 115, step 185 sets the number of times the program will go through the loop. Assuming that the truncated value for the divisor only considers the 4 most significant bits, the number of times through the loop is set to $(2^3)$ or 8. After the loop which is described below has been completed eight times, the program goes to step 190 where a determination is made whether the value for dividend counter j is equal to 0. If so, the program stops at step 205. If not, at step 195, the saved data is dumped into an output file in tabular format one entry at a time (based on the jth entry). Then, at step 200, the value for j is decremented and the program moves back to step 190.

If the divisor counter is still smaller than or equal to the upper bound of 7, the value for the divisor is calculated at step 210 by using the following formula: $DIVR=1+(i\times 2^{}-NO\_BITS\_DIVR-1))$. The rationale for this calculation is the same as in step 120. The program then continues to step 215 where the value for DONE is set equal to FALSE and the value for the dividend is set equal to zero. Then, at step 220, a determination is made whether all values of the dividend for the given divisor have been calculated. If so, the value for i is incremented at step 225, and then the program loops back to step 185. If not, the program continues to step 230** where the subroutine FIND_RANGE_NEGATIVE_REMAINDER is called.

FIG. 3D contains a flow diagram of the FIND_RANGE_NEGATIVE_REMAINDER subroutine which was called by the main program at step 230. The main program will loop to this subroutine where there is a negative partial remainder value during the recursive iteration for calculating the value of the final quotient. At step 355, the minimum and maximum values for the (most recently determined partial remainder ÷ divisor, or $z_j$) are set by the following formulas: $MAXX=DIVD/DIVR$; $MINN=(DIVD+[2^{}-(NO\_BITS\_DIVD-4)]+[2^{}-(NO\_BITS\_DIVD-4-1)]/(DIVR+[2^{}-(NO\_BITS\_DIVR-1)])$. These formulas are determined by taking into consideration the error due to truncation and two's complement representation. For example, the term $(2^{}-(NO\_BITS\_DIVD-4),$ or $2^{-3})$, in the numerator of MINN is a correction factor for the maximum error due to the truncation, as explained above. The term $(2^{}-(NO\_BITS\_DIVD-4-1),$ or $2^{-4})$, in the numerator of MINN is a correction factor for the maximum error due to imprecision in the two's complement representation, as described above. The term $(2^{}-(NO\_BITS\_DIVR-1),$ or $2^{-3})$, in the denominator of MINN is a correction factor for the maximum error due to truncation of the lookup table. The value for $z_j$ will be maximum when the dividend is at a maximum and when the divisor is at a minimum, and the value for $z_j$ will be minimum when the dividend is at a minimum and the divisor is at a maximum. The program then continues to step 360, and the flow of the FIND_RANGE_NEGATIVE_REMAINDER subroutine closely parallels the flow of the FIND_RANGE_POSITIVE_REMAINDER subroutine.

At step 360, a determination is made whether the value for MINN is equal to $-\frac{2}{3}$ or the value for MAXX is equal to $-5/3$. If so, at step 370, the program will report this as a boundary case. If not, the program continues to step 365 where a determination is made whether the value for MINN is equal to $-\frac{1}{3}$ or whether the value for MINN is equal to $-4/3$. If either determination is so, the program reports it as a boundary case at step 370 and proceeds to step 375. If the determination in steps 360 and 365 are both no, the program, at step 375, determines that the minimum and maximum values were incorrectly selected and continues to step 380.

At step 380, a determination is made whether the value for MINN is less than $\frac{2}{3}$ and whether the value for MAXX is greater than $-\frac{2}{3}$. If so, at step 385, the next quotient bit is set equal to 0 and the program determines that the minimum and maximum and resultant range values are OK. If either the value for MINN is not less than $\frac{2}{3}$ or the value for MAXX is not greater than $-\frac{2}{3}$, the program continues to step 390.

At step 390, a determination is made whether the value for MINN is less than $-\frac{1}{3}$ and whether the value for MAXX is greater than $-5/3$. If so, at step 400, the value for the next quotient digit is set to $-1$ and the program determines that the minimum and maximum values are correct and thus the range is OK. If not, the program continues to step 405.

At step 405, a determination is made whether the value for MINN is less than $-4/3$. If so, at step 410, the value for the next quotient digit is set to $-2$ and the program determines that the range is OK. If not, the program continues to step 415.

Each of steps 385, 400 and 410 branches to step 415 after selection of the next quotient digit. At step 415, a determination is made whether the value for MINN is less than $-\frac{1}{3}$ and whether the value for MAXX is greater than or equal to $-\frac{2}{3}$. If so, at step 420, the value for the next quotient digit is set to $-1$ or 0 and the program determines that the minimum, maximum and range values are OK. The program then continues to step 435. If either the value for MINN is not less than $-\frac{1}{3}$ or the value for MAXX is not greater than or equal to $-\frac{2}{3}$, the program branches to step 425.

At step 425, a determination is made whether the value for MINN is less than −4/3 and whether the value for MAXX is greater than or equal to −5/3. If not, the program branches to step 432. If so, at step 430, the value for the next quotient digit is set to −1 or −2 and the program determines that the range is OK. The program then continues to step 432. At step 432, a determination is made whether RANGE is equal to OK and, if not, the program continues at step 435.

At step 435, it is determined that more bits are needed to be inspected of the dividend and divisor and that the range has been incorrectly selected because the next quotient digit could not be determined. The subroutine then returns to the main program at step 235 since this error has occurred.

At step 235, a determination is made whether the minimum value for the most recently determined value of MINN is greater than or equal to 8/3. If so, DONE is set equal to TRUE at step 240 because 8/3 is the boundary of the Z—Z plot assuming the radix equals 4, and the program loops back to step 220. If not, a determination is made at step 245 whether more bits of the divisor must be inspected. If so, at step 250, the program determines that an error has been made and halts at step 255. If more bits are not needed, at step 260, the data from the FIND_RANGE_NEGATIVE_REMAINDER is saved to be output to a table at a later stage, and the value for dividend counter j is incremented. The program then continues to step 265 where the next value for the dividend is set equal to DIVD−2**−(NO_BITS_DIVD−1). The program then moves back to step 220 to calculate the next partial remainder with the new most recently determined partial remainder/divisor combination.

The output of the quotient selection program for the example of a radix 4, NO_BITS_DIVR=4, and NO_BITS_DIVD=7 is shown in Table 1 in FIG. 4. For each dividend/partial remainder value, Table 1 contains an octal and a decimal representation and similarly for each divisor value. The column heading labeled "quot val" lists the next quotient digit which should be selected. When there are 2 digits in the "quot val" column, either digit may be selected as the next quotient digit. The columns labeled "min range" and "max range" are the values calculated by the quotient selection program, MINN and MAXX as discussed above.

In accordance with the present invention, the method for implementing an optimized division circuit also includes the step of assigning a different state value to each different quotient digit, the state values to be used in the implementation of the optimized division circuit.

In Table 1 of FIG. 4, the column labeled "state assgn" shows the state values that were assigned to each quotient digit. There should be five possible states, one for each quotient digit from the set of acceptable digits −2, −1, 0, 1, 2. The state values are to be represented by combinations of asserted and unasserted bits, where a "1" is defined as an asserted bit. When assigning state values to the quotient digits, two rules are considered. First, the state value which is represented by the fewest number of asserted bits is assigned to the quotient digit which occurs most often in Table 1. Second, state values with increasing numbers of asserted bits are assigned to quotient digits which occur with decreasing frequency in the table.

In the presently preferred embodiment of the invention, these rules are obeyed as shown by the following state assignments: a binary "100" state value was assigned to a "−2" quotient digit, a binary "111" state value was assigned to a "−1" quotient digit, a binary "001" state value was assigned to a "0" quotient digit, a binary "011" state value was assigned to a "1" quotient digit and a binary "000" state value was assigned to a "2" quotient digit. As shown in Table 1, the state value is output in 2 digit form, indicating that the most significant bit or sign bit has been dropped. A "3" represents a "DON'T CARE" indicator where either a "1" or a "0" is correct. "A DON'T CARE" condition means that either of two quotient digits are acceptable, so the corresponding state bit can be either value. It should be noted that these assignments are exemplary only and should not constitute a limitation, as other assignments may also be satisfactory.

Once the state values are assigned, a truth table is generated based on Table 1. The data from Table 1 then preferably is input into a software utility which performs Boolean minimization of the terms. Although Socrates ™, a proprietary logic minimizer software utility of Digital Equipment Corporation has been used in the present invention, it will be apparent to those skilled in the art that any suitable utility providing this function may be used. An example of such software utility is the Expresso program commercially available from the University of California at Berkeley.

The outputted logic equations from the logic minimizer utility are then mapped into realizable circuit gates to implement the optimized division circuit of the present invention. Although SID ™, a proprietary synthesizer program of Digital Equipment Corporation, has been used in the present invention, it will be apparent to those skilled in the art that any suitable synthesizer program providing this function may be used. An example of such a synthesizer program is the SILC program commercially available from Silc Technologies Corporation.

C. Divide Circuitry

FIGS. 5A–5D constitute a block diagram illustrating a preferred embodiment of the optimized division circuit of the present invention. FIGS. 6A–6B contain an operational flow diagram illustrating the operation of the optimized division circuit of FIGS. 5A–5D. In accordance with the present invention, the optimized division circuit receives as inputs a divisor in binary normalized positive fractional format and a dividend in positive two's complement format and produces as an output a quotient also in positive two's complement format, the quotient being composed of a succession of quotient digits chosen from a set of acceptable digits determined according to a given radix.

In the embodiment shown in FIGS. 5A–5D and as shown in FIG. 6A, before being input to the circuit, the divisor is put into binary normalized positive fractional form, as has been previously discussed above (step 800 of FIG. 6A). The absolute value of the dividend is also formed prior to its being input to the circuit (step 800 of FIG. 6A).

Figure 5A:
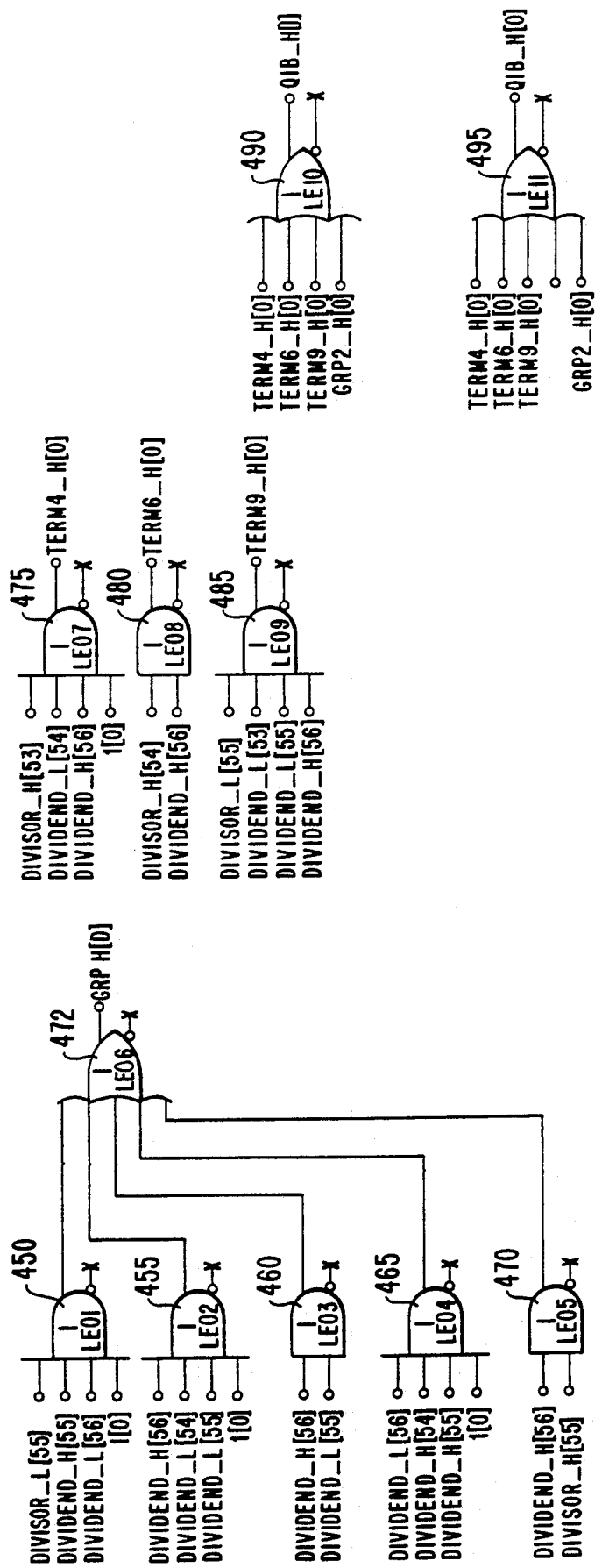
FIGS. 5A-5D are a block diagram illustrating the optimized division circuit in accordance with a preferred embodiment of the present invention.
Figure 5B:
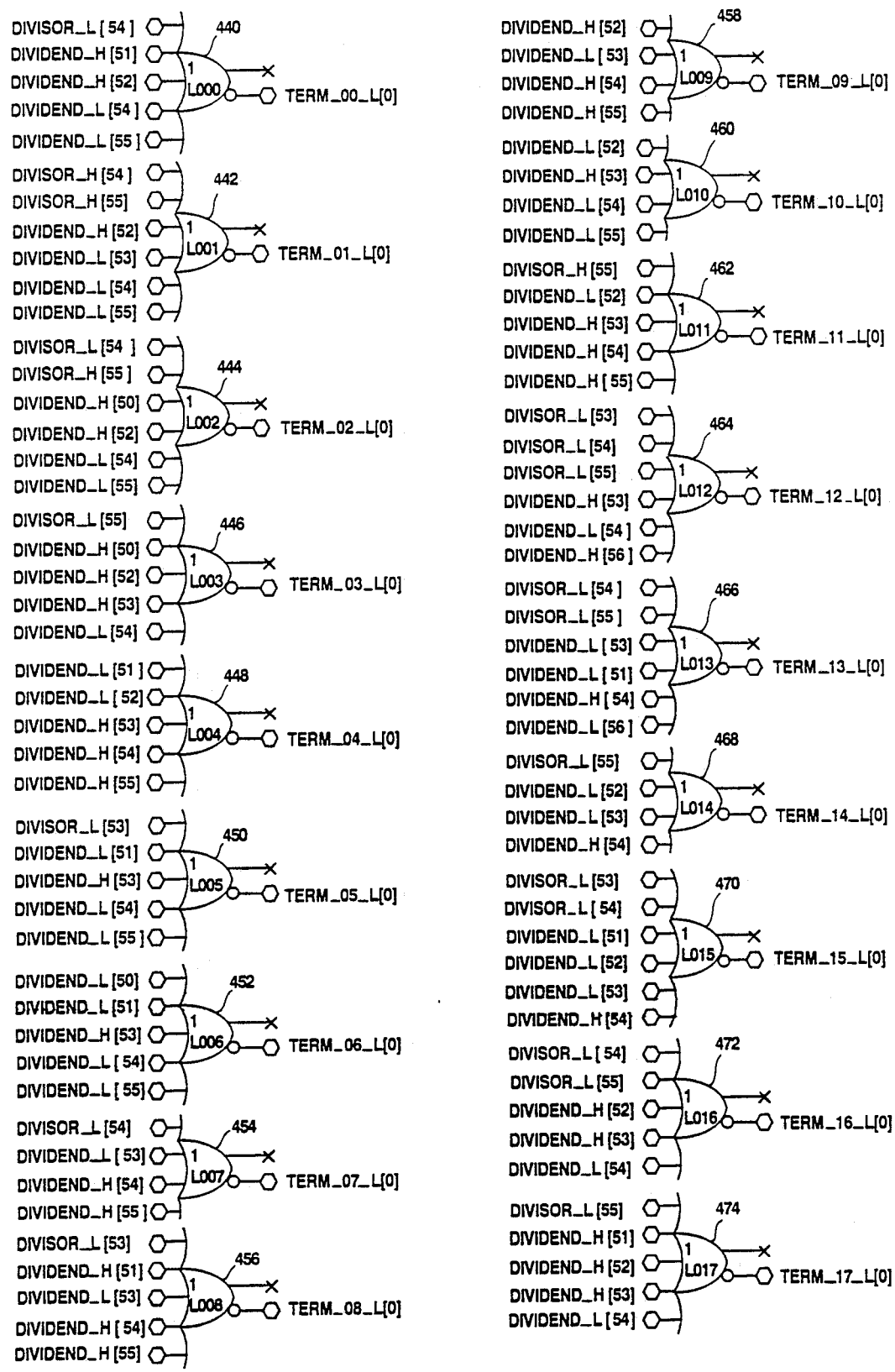
Figure 5B:
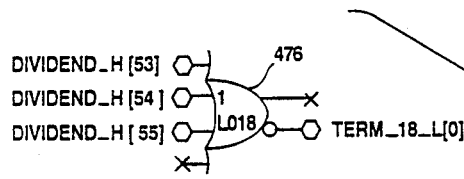
Figure 5B:
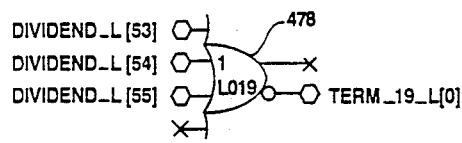
Figure 5B:
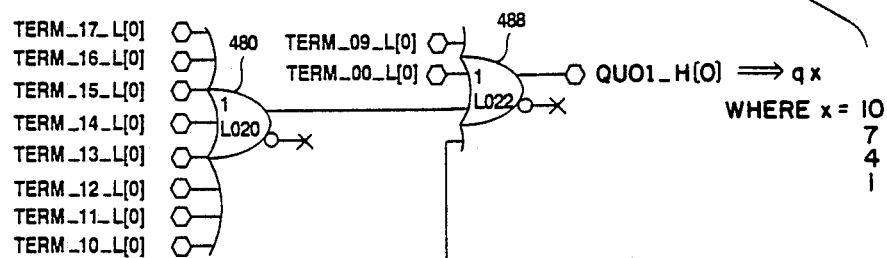
Figure 5B:
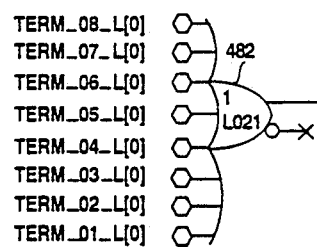
Figure 5B:
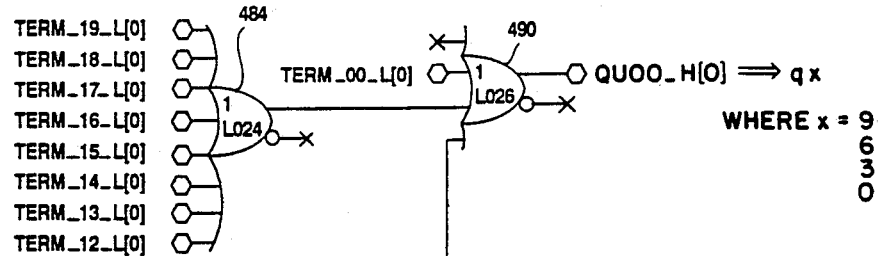
Figure 5B:
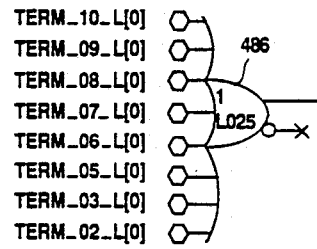
Figure 5C:
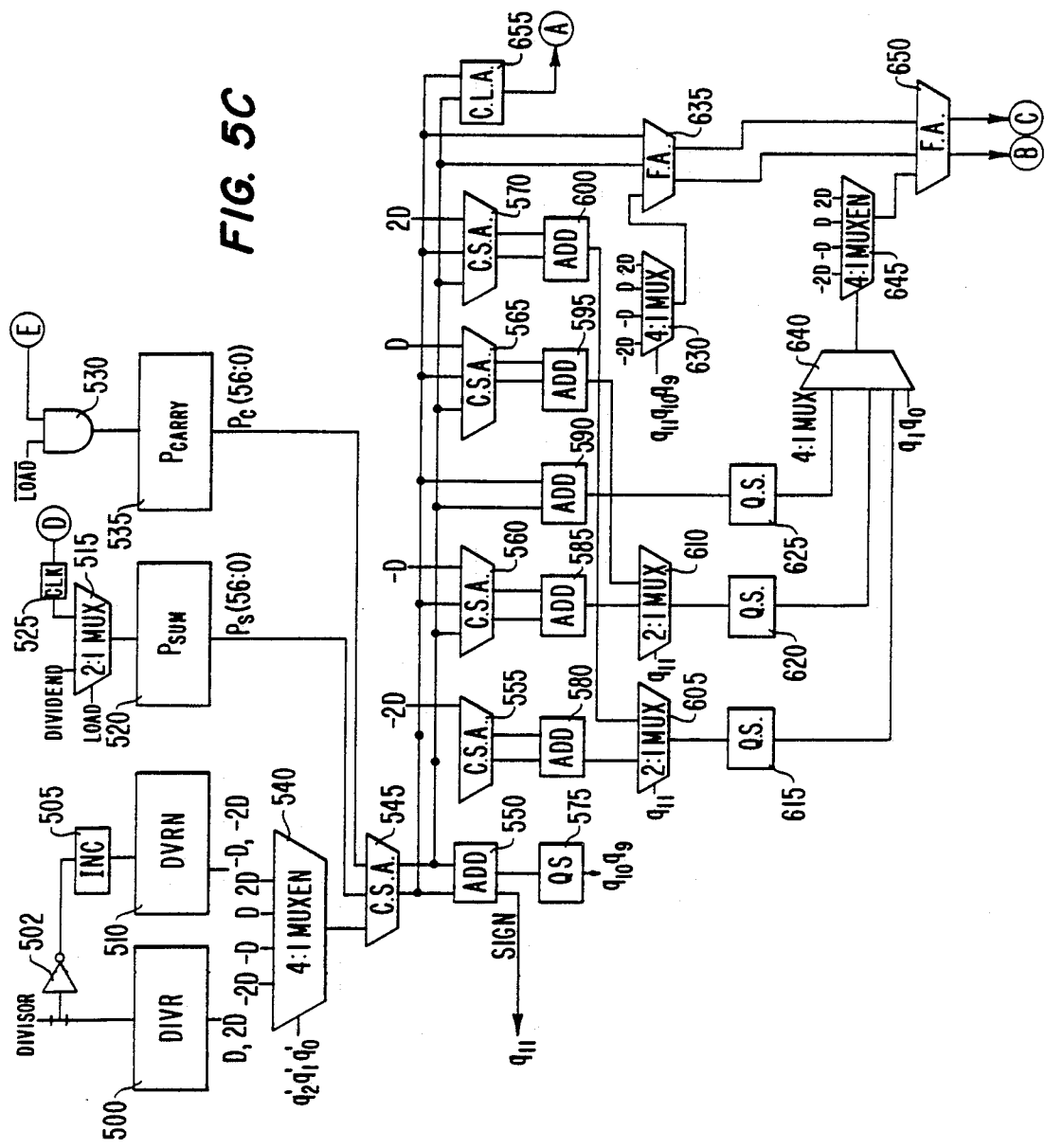
Figure 5D:
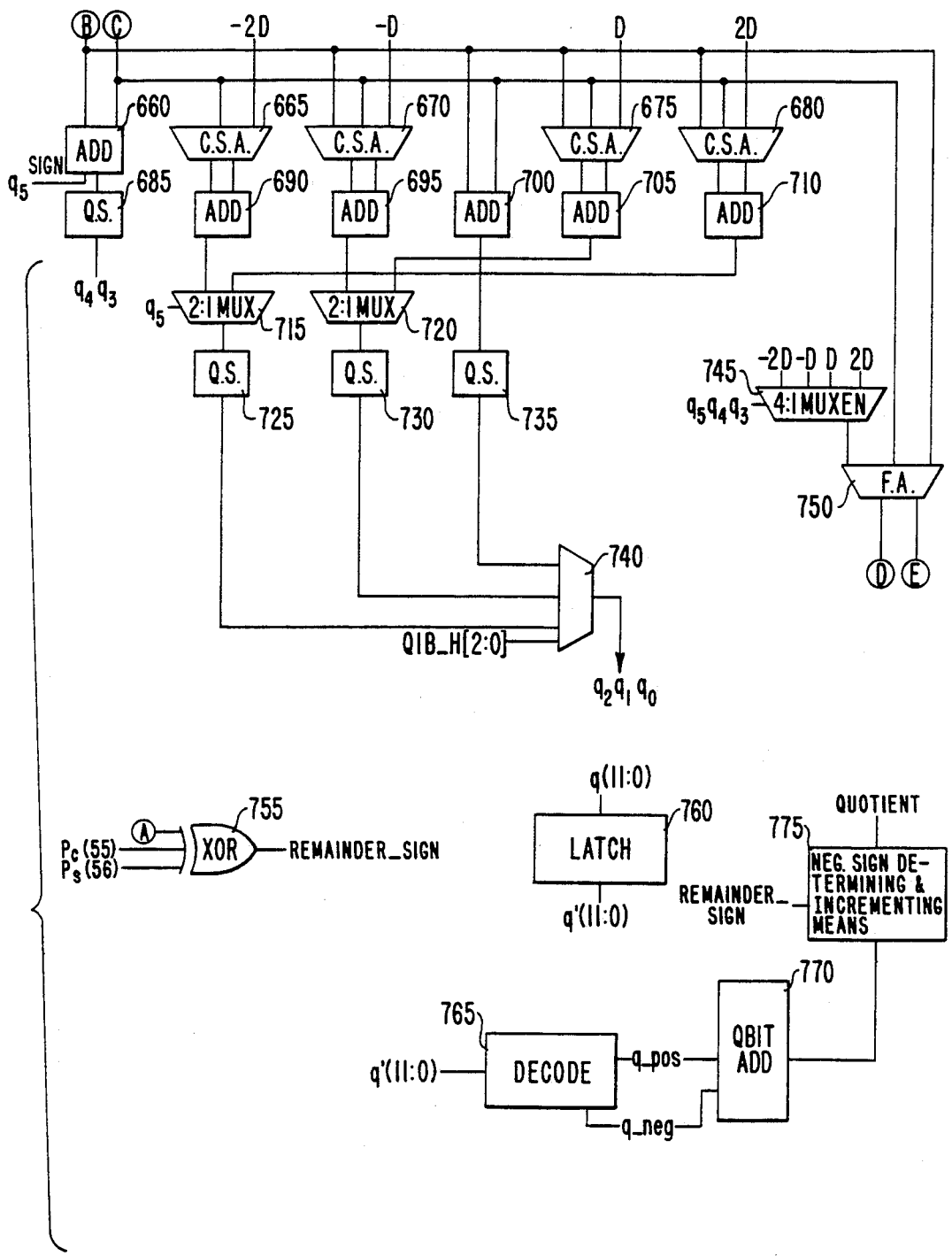
Figure 6B:
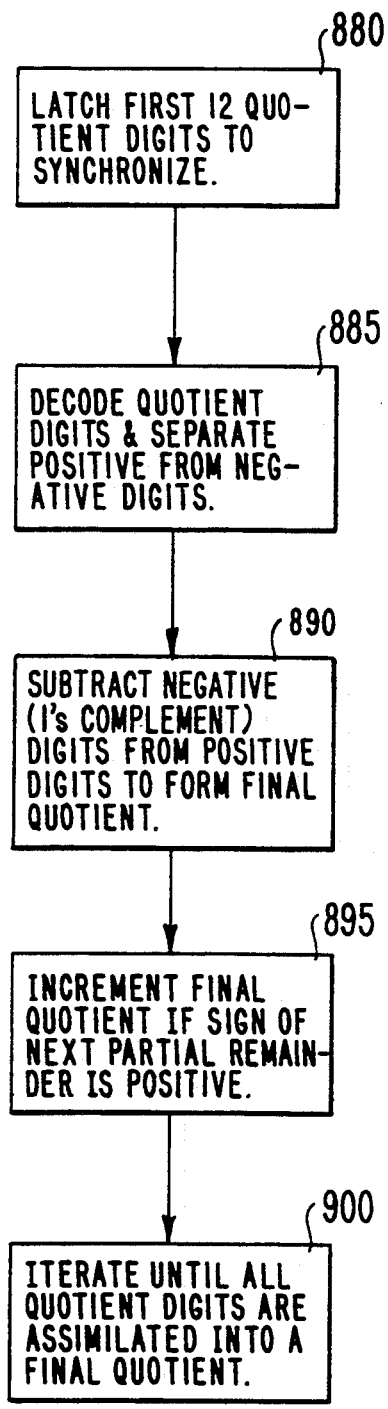

The circuit in FIG. 5A calculates the initial 3 quotient bits, $q'_2 q'_1 q'_0$, representing the first quotient digit, from the divisor and dividend (step 805 in FIG. 6A). In the example used in FIGS. 5A–5D and 6A–6B, the dividends and divisors each have 56 bits plus a sign bit. A 4-input AND gate 450 receives as inputs the inverted 55 th bit of the divisor, labeled divisor_L[55], the 55 th bit of the dividend, labeled dividend_H[55], the inverted 56 th bit of the dividend, labeled dividend_L[56], and a DON'T CARE term, labeled 1[0]. A 4-input AND gate 455 receives as inputs the 56 th bit of the dividend, the 54 th bit of the dividend, the 55 th bit of the dividend and a DON'T CARE term. A 2-input AND gate 460 receives as inputs the 56 th and 55 th bits of the dividend. A 4-input AND gate 465 receives as inputs the inverted 56 th bit of the dividend, the 56 th bit of the dividend, the 55 th bit of the dividend and a DON'T CARE term. A 2-input AND gate 470 receives as inputs the 56 th bit of the dividend and the 55 th bit of the divisor. The outputs of AND gates 450, 455, 460, 465 and 470 are input to 5-input OR gate 472 which outputs a signal labeled GRP2_H[0].

A 4-input AND gate 475 receives as inputs the 53 rd bit of the divisor, the inverted value of the 54 th bit of the dividend, the 56 th bit of the dividend and a DON'T CARE term and produces as an output a signal labeled TERM4_H[0]. A 2-input AND gate 480 receives as inputs the 54 th bit of the divisor and the 56 th bit of the dividend and produces as an output a signal labeled TERM6_H[0]. A 4-input AND gate 485 receives as inputs the inverted value of the 55 th bit of the divisor, the inverted value of the 53 rd bit of the dividend, the inverted value of the 55 th bit of the dividend and the 56 th bit of the dividend and produces as an output a signal labeled TERM9_H[0].

The outputs of gates 472, 475, 480 and 485 are then input to OR gates 490 and 495. Specifically, 4-input OR gate 490 receives as inputs signals TERM 4_H[0], TERM6_H[0], TERM9_H[0] and GRP2_H[0] and produces as an output the second most significant bit of the first quotient digit, Q1B_H[1] or $q_1$. A 5-input OR gate 495 receives as inputs signals TERM4_H[0], TERM-6_H[0], TERM9_H[0], the inverted value of the 56 th bit of the dividend and GRP2_H[0] and produces as an output the least significant bit of the first quotient digit, Q1B_H[0] or $q_0$. The most significant bit of the first quotient digit, $q_2$, represents the sign bit and is known to be 0. The first 3 quotient bits are then latched to form $q'_2 q'_1 q'_0$ (the '''' refers to a latched signal in this discussion). Additionally, by convention $q_2$ is always a "0" because it is assumed that the dividend is positive.

As stated above, the data from Table 1, which represents the quotient selection program output, is preferably input into logic minimizer utility software that outputs logic equations. Those logic equations are then mapped into realizable circuit gates to implement the optimized division circuit. FIG. 5B illustrates an exemplary quotient selection logic circuit that represents such an implementation. It is noted that the quotient selection circuit could also be implemented as look-up circuit in the form of a ROM or programmable logic array. Referring to FIG. 5B, the exemplary quotient selection circuit comprises a plurality of OR-gates 440, 442, 444, . . . 476 and 478 having inverted and non-inverted outputs. All of these OR-gates are shown as connected to receive different ones of the dividend bits, although for different quotient selection circuits, the appropriate partial remainder bits would be inputs to the OR-gates. Selected ones of the OR-gates are also connected to receive one or more of the divisor bits, the particular bits depending upon the particular selection circuit. For example, OR-gate 464 is connected to receive, in inverted form, bits 53-55 of the divisor, respectively labeled divisor_L[53], divisor_L[54]and divisor_L[55]. OR-gate 464 is also connected to receive the dividend bits labeled dividend H[53], dividend_L[54], and dividend_H[56].

The inverted outputs of OR-gates 440-478, e.g., the output of OR-gate 464 labeled TERM_12_L[0], are selectively connected as shown in FIG. 5B as inputs to OR-gates 480, 482, 484, and 486. An OR-gate 488 is connected to receive as inputs, the outputs of OR-gates 440, 458, 480, and 482. An OR-gate 490 is connected to receive as inputs, the outputs of OR-gates 440, 484, and 486. It is noted that the non-inverted inputs of OR-gates 480, 482, 484, and 486 are used. The output of OR-gate 488 is QUO1_H[0]. This circuit is used to determine quotient bit $q_x$ for x=1, 4, 7, 10, . . . . The output of OR-gate 490 is QUO0_H[0. This circuit is used to determine quotient bit $q_x$ for x=0, 3, 6, 9, . . . . Quotient bit $q_x$ for x=2, 5, 8 and 11 is a sign bit determined from the adder circuits as described below.

Referring next to FIG. 5C, the DIVR register 500 receives the divisor as an input (step 810 in FIG. 6A) and the DVRN register 510 receives the two's complement of the divisor (step 815 in FIG. 6A) as an input DVRN which was formed by passing the divisor through inverter 502 and sending the output of inverter 502 into INC register 505 which increments the inverted divisor by 1.

A 2:1 multiplexer, MUX 515, receives as inputs the absolute value of the dividend and the most recently determined partial remainder value, and has a LOAD signal at its select input terminal. MUX 515 selects as an output either the dividend, for the first iteration of the division procedure (LOAD=1) or the most recently determined partial remainder upon a subsequent iteration (LOAD=0).

The output of 2:1 MUX 515 is then loaded into $P_{SUM}$ register 520 (step 820 in FIG. 6A). Additionally, the sign is input through one input terminal of AND gate 530 which also receives a $\overline{LOAD}$ signal as an input and outputs a 1 if the most recently determined partial remainder was negative. The output of AND gate 530 is then loaded into $P_{CARRY}$ register 535. On the first iteration, the $P_{CARRY}$ register 535 is cleared (step 825 in FIG. 6A).

In accordance with the present invention, the optimized division circuit includes divisor multiple formation means, receiving as inputs the divisor and a most recently determined one of the quotient digits, for calculating successive divisor multiples as products of the divisor and of successive ones of the determined quotient digits.

As embodied herein, the DIVR register 500 and DVRN register 510 contain not only the divisor and the two's complement, but also two times those values which are obtained by a left-hand shift of one bit. These outputs represent products of the divisor and successive ones of the quotient digits and are inputs to a 4:1 multiplexer MUX 540 which selects one of the divisor multiples based on the previously determined initial 3 quotient digits, which are $q'_2 q'_1 q'_0$ for the first iteration and are formed by the circuit shown in FIG. 5A which are input to the selection terminal of MUX 540 (step 830 in FIG. 6A). The enable terminal of MUX 540 actually receives the logical OR of $q'_2 q'_1 q'_0$, and when all those bits are a value of 0, MUX 540 is disabled and outputs a value of 0.

In accordance with the present invention, the optimized division circuit further includes quotient determining means, coupled to receive the dividend and the successive divisor multiples, for producing the succession of quotient digits. The quotient determining means includes next partial remainder determining means, receiving as inputs the most recently determined divisor multiple and a most recently determined next partial remainder value or, if no next partial remainder value has yet been determined, the dividend, and produces the next partial remainder as an output. The quotient determining means further includes next quotient digit selection means, receiving as inputs at least a portion of the divisor and the next partial remainder, for selecting the next one of the quotient digits according to a predetermined relationship.

As embodied herein, carry save adder 545 receives as inputs the most recently determined divisor multiple from MUX 540 and the most recently determined partial remainder value from registers 520 and 535, or the dividend value if in the first iteration (step 835 in FIG. 6A). Adder 545 outputs a next partial remainder in the form of a partial sum and a partial carry.

The eleven most significant bits of the output from adder 545 is input to adder circuit 550 (step 840 in FIG. 6A). Preferably, adder circuit 550 is an 11 input bit wide full carry-lookahead adder which produces as an output a next partial remainder value from the sum of the 11 most significant bits of the next partial sum and the next partial carry. The carry out of adder circuit 550 is a sign bit $q_{11}$ which represents the sign of the next partial remainder. The seven most significant bits of the sum produced by adder circuit 550 are then an input into circuit Q.S. (quotient selection) 575 which preferably corresponds to the logic circuit illustrated in FIG. 5B and includes the logic of the quotient selection program described above with regard to FIGS. 3A-3D. Circuit Q.S. 575 generates the next quotient digits, $q_{10}q_9$ (step 850 in FIG. 6A).

In accordance with the present invention the quotient determining means also includes a plurality of quotient determining subcircuits each including next partial remainder determining means and next quotient digit selection means, and wherein the subcircuits are serially connected such that each of the subcircuits except the first one receives from a preceding one of the subcircuits in the serial connection one of the partial remainders as an input.

As embodied herein, simultaneous with the input of the next partial sum and the next partial carry to adder circuit 550, the ten most significant bits of the next partial sum and the next partial carry from adder 545, excluding the two most significant bits representative of a two-bit shift for radix 4 division, are input to carry save adders 555, 560, 565 and 570 (step 842 in FIG. 6A). Adder 555 also receives as an input divisor multiple −2D. Adder 560 also receives as an input divisor multiple −D. Adder 565 also receives as an input divisor multiple D. Adder 570 receives as an input divisor multiple 2D.

Simultaneous with the output from adder circuit 550 being input to Q.S. 575, as shown in FIG. 5C and step 852 in FIG. 6A, the outputs from adders 555, 565 and 570 are input to adder circuits 580, 585, 595 and 600, respectively, which perform a full carry-lookahead addition of the carry and 11 most significant sum bits. The carry and sum outputs from carry save adder 545 are also connected as inputs to adder circuit 590 which performs a full carry-lookahead addition of the carry and 11 most significant sum bits.

Thus, adder circuits 580, 585, 590, 595 and 600 each form a succeeding next partial remainder corresponding to a different one of the acceptable quotient digits each having a sign bit and a magnitude portion.

Next, as shown in FIG. 5C and at step 860 of FIG. 6A, the outputs from adder circuits 580 and 600, representing the −2D and 2D partial remainders, respectively, are connected to the input terminals of a 2:1 multiplexer MUX 605, and the sign bit $q_{11}$ from the next quotient digit is the input to the select terminal of MUX 605. MUX 605 then selects the proper sign for this possible value for the succeeding next partial remainder. The outputs from adder circuits 585 and 595, representing the −D and D partial remainders, respectively, are connected to the input terminals of a 2:1 multiplexer MUX 610, and the sign bit $q_{11}$ from the next quotient digit previously determined is input to the select terminal of MUX 610. MUX 610 then selects the proper sign for this possible value of the succeeding next partial remainder.

Then, as shown in FIG. 5C and at step 865 of FIG. 6A, the outputs from multiplexers 605 and 610 are input respectively, to circuits Q.S. 615 and Q.S. 620. Q.S. 615 and Q.S. 620 include the logic of the quotient selection program previously discussed and each produces as an output a three-bit code value for the succeeding next quotient digit to be selected. The output of adder circuit 590, representing the 0×D partial remainder, is input to circuit Q.S. 625 which produces as an output a value in 3-bit encoded format for the succeeding next quotient digit. Q.S. 625 also includes the previously described logic of the quotient selection program.

The outputs of circuits 615, 620 and 625 are input to a 4:1 multiplexer MUX 640. The initial quotient digit $q_1q_0$ is connected to the select terminal (step 870 of FIG. 6A). In response to the quotient digits, multiplexer MUX 640 selects the values for the succeeding next quotient digit, $q_8q_7q_6$.

Simultaneous with the output from adder 545 being input to adders 555, 560, 565 and 570, the output from adder 545 is also input to carry-lookahead circuit 655 which determines whether there is a carry-out from the sum of the next partial sum and the next partial carry (step 845 of FIG. 6A). Then, simultaneous with the outputs of adders 555, 560, 565 and 570 being input to adder circuits 580, 585, 595 and 600, respectively, the output of CLA 655 is exclusively-ORed by XOR gate 755 with the most significant bits of the next partial sum and the next partial carry previously determined, as shown in FIG. 5C (step 855 of FIG. 6A). XOR gate 755 outputs a sign bit for the next partial remainder.

The operation of the division circuit now reiterates (step 875 of FIG. 6A) in a manner similar to that described above, First, divisor multiples are inputs to a 4:1 multiplexer MUX 645. The next quotient digit, $q_{11}q_{10}q_9$, which was previously calculated is input to an enable terminal of MUX 645 which selects a succeeding divisor multiple based on the next quotient digit. Adder circuit 660 is similar to adder circuit 550, discussed above. Carry save adders 665, 670, 675 and 680 are similar to carry save adders 555, 560, 565 and 570, discussed above. Adder circuits 690, 695, 700, 705 and 710 operate in a manner similar to adder circuits 580, 585, 590, 595 and 600, discussed above. Multiplexers 715 and 720 operate in a manner similar to multiplexers 605 and 610 discussed above, and circuits 725, 730 and 735 are constructed the same as and operate in a manner similar to lookup circuits 615, 620 and 625 discussed above.

In accordance with the present invention, the optimized division circuit further includes quotient assimilation means, receiving as inputs the succession of quotient digits, for aligning the quotient digits relative to each other and for subtracting negative values of the next quotient digits from positive values of the next quotient digits to determine a final quotient value. The quotient assimilation means also includes means for determining whether the succeeding partial remainder has a negative value and, if so, for decrementing the final quotient value.

As embodied herein and as shown in FIGS. 5D and 6B, as the bits of the final quotient are determined, they are input to LATCH 760 which outputs a value of the quotient bits (step 880 of FIG. 6B). As the first quotient bits $q_{11}$ to $q_0$ are generated, they are provided as inputs to DECODE circuit 765 which decodes the quotient bits which had been previously encoded according to the state assignments in the quotient selection logic (step 885 of FIG. 6B).

First, the quotient bits are divided into 4 sets of 3 quotient bits. Set 1=quotient bit 11, quotient bit 10 and quotient bit 9. Set 2=quotient bit 8, quotient bit 7 and quotient bit 6. Set 3=quotient bit 5, quotient bit 4 and quotient bit 3. Set 4=quotient bit 2, quotient bit 1 and quotient bit 0. The most significant bit of each set represents the sign bit with a "1" representing a negative value. Set 1 is decoded into quotient bits 7 and 6 (the sign bit is saved). Set is decoded into quotient bits 5 and 4. Set 3 is decoded into quotient bits 3 and 2. Set 4 is decoded into quotient bits 1 and 0.

DECODE circuit 765 then aligns the quotient digits relative to each other into positive quotient digits and negative quotient digits. If quotient bit 11 was a "1," then the decoded values for quotient bit 1 and quotient bit 0 are loaded into a q_neg register in bit positions 7 and 6 and "0"'s are loaded into a q_pos register for bit positions 7 and 6. If quotient bit 11 was a "0," then the decoded values for quotient bit 1 and quotient bit 0 are loaded into the q_pos register and "0"'s are loaded into the q_neg register at bit positions 7 and 6. The same procedure is followed for the other quotient bits as well.

The q_pos register and q_neg register are input to QBIT ADD circuit 770 which subtracts the q_neg register from the q_pos register to determine a final quotient value (step 890 of FIG. 6B). The subtraction is implemented by adding the one's complement of the value in the q_neg register to the value in the q_pos register. This procedure is done "on the fly," i.e., there is no need to wait until all q_pos digits and all q_neg digits are determined. Rather, it is iterated for every 9 q_pos and q_neg digits. If the output from XOR gate 755 was a "0" for a positive next partial remainder, the output from QBIT ADD circuit 770 is incremented by circuit 775 (step 895 of FIG. 6B). The quotient assimilation operation is reiterated until all bits of the final quotient are determined (step 900 of FIG. 6B).

D. Summary

As the preceding discussion explains, the method of implementing the optimized division circuit of the present invention utilizes a Z—Z plot relationship which is automatically constructed and in which there are precisely defined boundaries. The Z—Z plot relationship is utilized to form a complete look-up table which is then used to implement the optimized division circuit automatically. The division circuit of the present invention reduces the necessary logic levels needed to implement the circuit which results in fewer gates and stages needed for the implementation of the circuit thereby increasing the speed of the division operation.

It will be apparent to those skilled in the art that various modifications and variations can be made in the method and apparatus of the present invention without departing from the scope or spirit of the invention. Thus, it is intended that the present invention cover the modifications and variations of this invention provided they come within the scope of the appended claims and their equivalents.

What is claimed is:

1. A method for implementing an optimized division circuit having as inputs a divisor and a dividend and producing as an output a quotient composed of a succession of quotient digits chosen from a set of acceptable digits determined according to a given radix, each successive digit of said quotient being formed by examining a succession of partial remainder values and said divisor wherein a next partial remainder value is equal to the difference between a most recently determined partial remainder value and a most recently determined divisor multiple value, and wherein said most recently determined divisor multiple value is equal to the product of the most recently formed quotient digit and said divisor, a first value for said most recently determined partial remainder value being said dividend, said method comprising the steps of:

(a) determining a Z—Z plot relationship for said set of acceptable quotient digits representing, for each of said set of acceptable digits for said quotient, a relationship between a first divisor ratio and a second divisor ratio, the first divisor ratio being proportional to a range of most recently determined partial remainder values divided by the divisor, and the second divisor ratio being equal to a range of next partial remainder values divided by the divisor;

(b) automatically building a complete table of next quotient digits from said Z—Z plot relationship including, for each different valid combination of divisor and next partial remainder values, either a corresponding one of said acceptable quotient digits or a DON'T CARE indicator for the ones of said combinations having more than one corresponding quotient digit; and (c) assigning a different state value to each different quotient digit, said state values used in the implementation of said optimized division circuit.

2. The method of claim 1, wherein said state values are represented by combinations of asserted and unasserted bits, and wherein said state value assigning step includes the substeps of:

assigning to the quotient digit which occurs most frequently in said complete table a state value represented by the fewest number of asserted bits; and assigning state values with increasing numbers of asserted bits to quotient digits which occur with decreasing frequency in said complete table.

3. The method of claim 1 wherein said Z—Z plot relationship determining step includes the substeps of:

determining a minimum value and a maximum value for said first divisor ratio corresponding to positive and negative values of said most recently determined partial remainder values.

4. The method of claim 3 wherein the step of determining said minimum and said maximum values includes the substep of using only a truncated portion of said divisor and a truncated portion of said most recently determined partial remainder values in determining said maximum and minimum values.

5. The method of claim 4 wherein the radix equals 4 and wherein the step of using only a truncated portion of said divisor and said most recently determined partial remainder values includes the substeps of using only the four most significant bits of said divisor and the seven most significant bits of said most recently determined partial remainder values.

6. The method of claim 1 wherein said Z—Z plot has a horizontal range indicating maximum and minimum values for said first divisor ratios and a vertical range indicating maximum and minimum values for said second divisor ratios, and wherein said Z—Z plot relationship determining step includes the substeps of:

setting said horizontal range of said Z—Z plot from $(-r \times k)$ to $(r \times k)$, where r equals said given radix and k is a constant which is determined based on said given radix such that $-k \leq$ said second divisor ratio $\leq k$; and setting the vertical range from $-k$ to $+k$.

7. The method of claim 1 further including the step of converting the divisor into binary normalized positive fractional format prior to said Z—Z plot relationship determining step.

8. A method for implementing a selected subcircuit of an optimized division circuit having as inputs a divisor and a dividend and producing as an output a quotient composed of a succession of quotient digits chosen from a set of acceptable digits determined according to a given radix, said subcircuit receiving as inputs corresponding portions of said divisor and said dividend and producing as an output a corresponding portion of said quotient, each successive digit of said quotient portion being formed by examining a succession of partial remainder values and said divisor wherein a next partial remainder value is equal to the difference between a most recently determined partial remainder value and a most recently determined divisor multiple value, said most recently determined divisor multiple value being equal to the product of the most recently formed quotient digit and said divisor, a first value for said most recently determined partial remainder value being said dividend portion, said method comprising the steps of:

(a) determining a Z—Z plot relationship for said set of acceptable quotient digits representing, for each of said set of acceptable digits for said quotient, a relationship between a first divisor ratio and a second divisor ratio, the first divisor ratio being proportional to most recently determined partial remainder values divided by the divisor, and the second divisor ratio being equal to next partial remainder values divided by the divisor;

(b) automatically building a complete table of next quotient digits from said Z—Z plot relationship including, for each different valid combination of divisor and next partial remainder values, either a corresponding one of said acceptable quotient digits or a DON'T CARE indicator for the ones of said combinations having more than one corresponding quotient digit; and (c) assigning a different state value to each different quotient digit, said state values used in the implementation of said selected subcircuit of said optimized division circuit.

9. The method of claim 8, wherein said state values are represented by combinations of asserted and unasserted bits, and wherein said state value assigning step includes the substeps of:

assigning to the quotient digit which occurs most frequently in said complete table a state value represented by the fewest number of asserted bits; and assigning state values with increasing numbers of asserted bits to quotient digits which occur with decreasing frequency in said complete table.

10. The method of claim 8 wherein said Z—Z plot relationship determining step includes the substeps of:

determining a minimum value and a maximum value for said first divisor ratio for positive and negative values of said most recently determined partial remainder values.

11. The method of claim 10 wherein the step of determining said minimum and said maximum values includes the substep of using only a truncated portion of said divisor and a truncated portion of said most recently determined partial remainder values in determining said maximum and minimum values.

12. The method of claim 11 wherein the radix equals 4 and wherein the step of using only a truncated portion of said divisor and said most recently determined partial remainder values includes the substeps of using only the four most significant bits of said divisor and the seven most significant bits of said most recently determined partial remainder values.

13. The method of claim 8 wherein said Z—Z plot has a horizontal range indicating maximum and minimum values for said first divisor ratios and a vertical range indicating maximum and minimum values for said second divisor ratios, wherein said Z—Z plot relationship determining step includes the substeps of:

setting said horizontal range of said Z—Z plot from $(-r \times k)$ to $(r \times k)$, where r equals said given radix and k is a constant which is determined based on said given radix such that $-k \leq$ said second divisor ratio $\leq k$; and setting the vertical range from $-k$ to $+k$.

14. The method of claim 8 further including the step of converting the divisor are in binary normalized positive fractional format prior to said Z—Z plot relationship determining step.

15. An optimized division circuit receiving as inputs a divisor in binary normalized positive fractional format and a dividend in positive two's complement format and producing as an output a quotient also in positive two's complement format, said quotient being composed of a succession of quotient digits chosen from a set of acceptable digits determined according to a given radix, said circuit comprising:

(a) divisor multiple formation means, receiving as inputs the divisor and a most recently determined one of said quotient digits, for calculating successive divisor multiples as products of said divisor and of successive ones of said determined quotient digits, said divisor multiple formation means including (1) a divisor multiple multiplexer having selection terminals connected to receive said most recently determined quotient digit and input terminals connected to receive input signals representing various multiples of said divisor; and (b) quotient determining means, coupled to receive said dividend and said successive divisor multiples, for producing said succession of quotient digits, said quotient determining means including:

(1) next partial remainder determining means, receiving as inputs the most recently determined divisor multiple and a most recently determined next partial remainder value or, if no next partial remainder value has yet been determined, said dividend, and for producing the next parallel remainder as an output; and (2) next quotient digit selection means, receiving as inputs at least a portion of said divisor and said next partial remainder, for determining the next one of said quotient digits according to a predetermined Z—Z plot relationship between a first divisor ratio and a second divisor ratio, the first divisor ratio being proportional to a range of most recently determined partial remainder values divided by the allowable values for the portion of the divisor received as the input of the next quotient digit selection means, and the second divisor ratio being equal to a range of next partial remainder values divided by the allowable values of the portion of the divisor received as the inputs of the next quotient digit selection means;

wherein said next partial remainder determining means includes first quotient digit selector means, receiving as inputs the most recently determined divisor multiple and the most recently determined next remainder value, for determining said next quotient digit, and second quotient digit selector means, receiving as inputs said next quotient digit from said first quotient digit selector means, for determining a succeeding next quotient digit, said second quotient digit selector means operating in an overlapped manner with said first quotient digit selector means, such that the determination of said succeeding next quotient digit begins before said first quotient digit selector means has completed its determination of said next quotient digits.

16. The circuit of claim 15 wherein said divisor multiple multiplexer includes a disable terminal coupled to receive a disable signal causing said divisor multiple multiplexer to output the value of zero, and wherein said optimized division circuit further includes a zero quotient signal formation means, coupled to receive the most recently determined next quotient digit, for forming said disable signal when said most recently determined quotient digit represents a value of zero.

17. The circuit of claim 15 wherein said first quotient digit selector means includes a carry save adder circuit, coupled to receive as inputs the most recently determined divisor multiple, the most recently determined next partial remainder value or, if not next partial remainder value has yet been determined, said dividend, and producing as an output, the next partial remainder, and a quotient value selection circuit, coupled to receive said next partial remainder, and at least a portion of said divisor, for generating said next quotient digit.

18. The circuit of claim 17 wherein said second quotient digit selector means includes a plurality of adder circuits, each coupled to receive the most significant bits of the output of said first quotient digit selector means carry save adder and each coupled to receive a different one of a plurality of divisor multiples corresponding to different ones of said acceptable digits for said quotient, said adder circuits forming a plurality of possible succeeding partial remainders, each having a sign bit and a magnitude portion, said possible succeeding partial remainders each corresponding to a different one of said acceptable digits, sign collection means having selection terminals coupled to receive a sign bit portion of said next quotient digit determined by said first quotient digit selector means and having input terminals connected to receive the outputs of said adder circuits, for ensuring that the possible succeeding partial remainders have the proper polarity, a plurality of quotient value selection circuits, each coupled to receive a corresponding output of said sign collection means and at least a portion of said divisor, for outputting a corresponding one of said succeeding quotient digits, and selector means, having selection terminals coupled to receive a magnitude portion of said next quotient digit determined by said first quotient digit selector means and having input terminals coupled to receive the outputs of said selection circuits for selecting said succeeding next quotient digits.

19. A method for automatic division of a divisor and a dividend and producing as an output a quotient, said quotient being composed of a succession of quotient digits chosen from a set of acceptable digits determined according to a given radix, said method comprising the steps of:

(a) forming a plurality of divisor multiples from the divisor and successive divisor multiples as products of said divisor and of successive ones of said determined quotient digits;

(b) determining a quotient from said dividend and said successive divisor multiples and producing said succession of quotient digits, said quotient determining step including the substeps of (1) determining a next partial remainder from the most recently determined divisor multiple and a most recently determined next partial remainder value or, if no next partial remainder value has yet been determined from said dividend, and producing the next partial remainder as an output, and (2) selecting a next quotient digit from at least a portion of said divisor and said next partial remainder, and determining the next one of said quotient digits according to a predetermined Z—Z plot relationship between a first divisor ratio and a second divisor ratio, the first divisor ratio being proportional to a range of most recently determined partial remainder values divided by the allowable values for the portion of the divisor received as the input of the next quotient digit selection means, and the second divisor ratio being equal to a range of next partial remainder values divided by the allowable values of the portion of the divisor received as the inputs of the next quotient digit selection means;

(c) receiving as inputs said succession of quotient digits;

(d) aligning said quotient digits relative to each other; and (e) subtracting 1's complement negative values of said next quotient digits from positive values of said next quotient digits on the fly to determine a final quotient value.

20. An optimized division circuit receiving as inputs a divisor in binary normalized positive fractional format and a dividend in positive two's complement format and producing as an output a quotient also in positive two's complement format, said quotient being composed of a succession of quotient digits chosen from a set of acceptable digits determined according to a given radix, said circuit comprising:

(a) divisor multiple formation means, receiving as inputs the divisor and a most recently determined one of said quotient digits, for calculating successive divisor multiples as products of said divisor and of successive ones of said determined quotient digits, said divisor multiple formation means including
  (1) a divisor multiple multiplexer having selection terminals connected to receive said most recently determined quotient digit and input terminals connected to receive input signals representing various multiples of said divisor;
(b) quotient determining means, coupled to receive said dividend and said successive divisor multiples, for producing said succession of quotient digits, said quotient determining means including:
  (1) next partial remainder determining means, receiving as inputs the most recently determined divisor multiple and a most recently determined next partial remainder value or, if no next partial remainder value has yet been determined, said dividend, and for producing the next partial remainder as an output; and
  (2) next quotient digit selection means, receiving as inputs at least a portion of said divisor and said next partial remainder, for determining the next one of said quotient digits according to a predetermined Z—Z plot relationship between a first divisor ratio and a second divisor ratio, the first divisor ratio being proportional to a range of most recently determined partial remainder values divided by the allowable values for the portion of the divisor received as the input of the next quotient digit selection means, and the second divisor ratio being equal to a range of next partial remainder values dividend by the allowable values of the portion of the divisor received as the inputs of the next quotient digit selection means; and
(c) quotient assimilation means, receiving as inputs said succession of quotient digits, for aligning said quotient digits relative to each other and for subtracting 1's complement negative values of said next quotient digits from positive values of said next quotient digits to determine a final quotient value, said quotient assimilation means including means for determining if the succeeding partial remainder has a positive value and, if so, incrementing said final quotient value.

21. An optimized division circuit receiving as inputs a divisor in binary normalized positive fractional format and a dividend in positive two's complement format and producing as an output a quotient also in positive two's complement format, said quotient being composed of a succession of quotient digits chosen from a set of acceptable digits determined according to a given radix, said circuit comprising:

(a) divisor multiple formation means, receiving as inputs the divisor and a most recently determined one of said quotient digits, for calculating successive divisor multiples as products of said divisor and of successive ones of said determined quotient digits, said divisor multiple formation means including
  (1) a divisor multiple multiplexer having selection terminals connected to receive said most recently determined quotient digit and input terminals connected to receive input signals representing various multiples of said divisor; and
(b) quotient determining means, coupled to receive said dividend and said successive divisor multiples, for producing said succession of quotient digits, said quotient determining means including:
  (1) next partial remainder determining means, receiving as inputs the most recently determined divisor multiple and a most recently determined next partial remainder value or, if no next partial remainder value has yet been determined, said dividend, and for producing the next partial remainder as an output; and
  (2) next quotient digit selection means, receiving as inputs at least a portion of said divisor and said next partial remainder, for determining the next one of said quotient digits according to a predetermined Z—Z plot relationship between a first divisor ratio and a second divisor ratio, the first divisor ratio being proportional to a range of most recently determined partial remainder values divided by the allowable values for the portion of the divisor received as the input of the next quotient digit selection means, and the second divisor ratio being equal to a range of next partial remainder values divided by the allowable values of the portion of the divisor received as the inputs of the next quotient digit selection means;
wherein said divisor multiple formation means includes
an inverter circuit receiving as an input said divisor in binary normalized form and forming a negative value of said divisor,
an incrementer circuit, receiving said negative value of said divisor and incrementing it to form a two's complement value of said divisor, and
routing means, receiving as inputs said divisor and said two's complement value of said divisor, and forming said products of said divisor and said successive ones of said determined quotient digits.

22. An optimized division circuit receiving as inputs a divisor in binary normalized positive fractional format and a dividend in positive two's complement format and producing as an output a quotient also in positive two's complement format, said quotient being composed of a succession of quotient digits chosen from a set of acceptable digits determined according to a given radix, said circuit comprising:

(a) divisor multiple formation means, receiving as inputs the divisor and a most recently determined one of said quotient digits, for calculating successive divisor multiples as products of said divisor and of successive ones of said determined quotient digits, said divisor multiple formation means including
  (1) a divisor multiple multiplexer having selection terminals connected to receive said most recently determined quotient digit and input terminals connected to receive input signals representing various multiples of said divisor;
(b) quotient determining means, coupled to receive said dividend and said successive divisor multiples, for producing said succession of quotient digits, said quotient determining means including:

(1) next partial remainder determining means, receiving as inputs the most recently determined divisor multiple and a most recently determined next partial remainder value or, if no next partial remainder value has yet been determined, said dividend, and for producing the next partial remainder as an output; and (2) next quotient digit selection means, receiving as inputs at least a portion of said divisor and said next partial remainder, for determining the next one of said quotient digits according to a predetermined Z—Z plot relationship between a first divisor ratio and a second divisor ratio, the first divisor ratio being proportional to a range of most recently determined partial remainder values divided by the allowable values for the portion of the divisor received as the input of the next quotient digit selection means, and the second divisor ratio being equal to a range of next partial remainder values divided by the allowable values of the portion of the divisor received as the inputs of the next quotient digit selection means;

(c) quotient assimilation means, receiving as inputs said succession of quotient digits, for aligning said quotient digits relative to each other and for subtracting 1's complement negative values of said next quotient digits from positive values of said next quotient digits on the fly to determine a final quotient value, said quotient assimilation means including means for determining if the succeeding partial remainder has a positive value and, if so, incrementing said final quotient value.

* * * * *